(12) United States Patent
Jarvis et al.

(10) Patent No.: US 10,803,420 B2
(45) Date of Patent: Oct. 13, 2020

(54) HYBRID MODULAR STORAGE FETCHING SYSTEM

(71) Applicant: Staples, Inc., Framingham, MA (US)

(72) Inventors: Daniel Jarvis, Orlando, FL (US); Paolo Gerli Amador, Framingham, MA (US); Michael Bhaskaran, Seattle, WA (US); Vikranth Gopalakrishnan, Hoboken, NJ (US); Rodney Gallaway, Little Rock, AR (US)

(73) Assignee: Staples, Inc., Framingham, MA (US)

(*) Notice: Subject to any disclaimer, the term of this patent is extended or adjusted under 35 U.S.C. 154(b) by 87 days.

(21) Appl. No.: 15/721,472

(22) Filed: Sep. 29, 2017

(65) Prior Publication Data

US 2018/0096299 A1 Apr. 5, 2018

Related U.S. Application Data

(60) Provisional application No. 62/403,001, filed on Sep. 30, 2016.

(51) Int. Cl.
*G06Q 10/08* (2012.01)
*G01C 21/20* (2006.01)
(Continued)

(52) U.S. Cl.
CPC ....... *G06Q 10/0875* (2013.01); *G01C 21/206* (2013.01); *G05D 1/0225* (2013.01);
(Continued)

(58) Field of Classification Search
CPC ............. G06Q 10/0875; G06Q 10/087; G05D 1/0297; G05D 1/0274; G05D 1/0285;
(Continued)

(56) References Cited

U.S. PATENT DOCUMENTS 3,450,276 A 6/1969 Ferrari
3,474,877 A 10/1969 Wesener
(Continued)

FOREIGN PATENT DOCUMENTS

CA 1196712 A 11/1985
CA 1210367 A 8/1986
(Continued)

OTHER PUBLICATIONS

US 9,342,073 B2, 05/2016, Bernstein et al. (withdrawn)
(Continued)

*Primary Examiner* — Michael V Kerrigan
(74) *Attorney, Agent, or Firm* — Patent Law Works, LLP

(57) ABSTRACT

A hybrid modular storage fetching system is described. In an example implementation, the system may include a warehouse execution system adapted to generate a picking schedule for picking pick-to-cart and high-density storage items, and an AGV dispatching system adapted to dispatch a cart automated guided vehicle and a modular storage fetching automated guided vehicle based on the picking schedule. The cart automated guided vehicle may be adapted autonomously transport a carton through a pick-to-cart area and to a pick-cell station. The modular storage fetching automated guided vehicle may be adapted to synchronously autonomously transport a modular storage unit containing items to be placed in the cartons from a high-density storage area to the pick-cell station.

20 Claims, 17 Drawing Sheets

(51) Int. Cl.
    *G05D 1/02* (2020.01)
    *B65G 43/00* (2006.01)
(52) U.S. Cl.
    CPC ......... *G05D 1/0274* (2013.01); *G05D 1/0285* (2013.01); *G05D 1/0297* (2013.01); *B65G 43/00* (2013.01); *B65G 2209/06* (2013.01); *G05D 2201/0216* (2013.01)
(58) Field of Classification Search
    CPC ......... G05D 1/0225; G05D 2201/0216; G05D 1/0088; G01C 21/206; B65G 2209/06; B65G 43/00; B65G 1/1373; B65G 1/137; B65G 1/1378
    See application file for complete search history.

(56) References Cited

U.S. PATENT DOCUMENTS

| | | |
|---|---|---|
| 3,563,327 A | 2/1971 | Mier |
| 3,628,624 A | 12/1971 | Wesener |
| 3,970,840 A | 7/1976 | De Bruine |
| 4,010,409 A | 3/1977 | Waites |
| 4,077,535 A | 3/1978 | Oriol |
| 4,215,759 A | 8/1980 | Diaz |
| 4,258,813 A | 3/1981 | Rubel |
| 4,278,142 A | 7/1981 | Kono |
| 4,465,155 A | 8/1984 | Collins |
| 4,496,274 A | 1/1985 | Pipes |
| 4,524,314 A | 6/1985 | Walker |
| 4,530,056 A | 7/1985 | MacKinnon et al. |
| 4,556,940 A | 12/1985 | Katoo et al. |
| 4,562,635 A | 1/1986 | Carter |
| 4,566,032 A | 1/1986 | Hirooka et al. |
| 4,593,238 A | 6/1986 | Yamamoto |
| 4,593,239 A | 6/1986 | Yamamoto |
| 4,652,803 A | 3/1987 | Kamejima et al. |
| 4,653,002 A | 3/1987 | Barry |
| 4,657,463 A | 4/1987 | Pipes |
| 4,678,390 A | 7/1987 | Bonneton et al. |
| 4,700,302 A | 10/1987 | Arakawa et al. |
| 4,711,316 A | 12/1987 | Katou et al. |
| 4,714,399 A | 12/1987 | Olson |
| 4,716,530 A | 12/1987 | Ogawa et al. |
| 4,727,492 A | 2/1988 | Reeve et al. |
| 4,742,283 A | 5/1988 | Bolger et al. |
| 4,751,983 A | 6/1988 | Leskovec et al. |
| 4,764,078 A | 8/1988 | Neri |
| 4,772,832 A | 9/1988 | Okazaki |
| 4,773,018 A | 9/1988 | Lundstroem |
| 4,777,601 A | 10/1988 | Boegli |
| 4,780,817 A | 10/1988 | Lofgren |
| 4,790,402 A | 12/1988 | Kasper |
| 4,802,096 A | 1/1989 | Hainsworth |
| 4,811,227 A | 3/1989 | Wikstroem |
| 4,811,229 A | 3/1989 | Wilson |
| 4,817,000 A | 3/1989 | Eberhardt |
| 4,846,297 A | 7/1989 | Kasper |
| 4,847,769 A | 7/1989 | Reeve |
| 4,847,773 A | 7/1989 | Peteri |
| 4,847,774 A | 7/1989 | Tomikawa |
| 4,852,677 A | 8/1989 | Okazaki |
| 4,857,912 A | 8/1989 | Gilbreath |
| 4,858,132 A | 8/1989 | Holmquist |
| 4,862,047 A | 8/1989 | Hosoi |
| 4,863,335 A | 9/1989 | Herigstad |
| 4,875,172 A | 10/1989 | Kanayama |
| 4,890,233 A | 12/1989 | Hosoi |
| 4,918,607 A | 4/1990 | Wible |
| 4,924,153 A | 5/1990 | Toru |
| 4,926,544 A | 5/1990 | Takao |
| 4,935,871 A | 6/1990 | Grohsmeyer |
| 4,939,650 A | 7/1990 | Nishikawa |
| 4,939,651 A | 7/1990 | Onishi |
| 4,942,531 A | 7/1990 | Hainsworth |
| 4,947,324 A | 8/1990 | Kamimura |
| 4,950,118 A | 8/1990 | Mueller |
| 4,954,962 A | 9/1990 | Weiman |
| 4,982,329 A | 1/1991 | Onishi |
| 4,990,841 A | 2/1991 | Elder |
| 4,993,507 A | 2/1991 | Ohkura |
| 4,994,970 A | 2/1991 | Noji |
| 4,996,468 A | 2/1991 | Kasper |
| 5,000,279 A | 3/1991 | Yamauchi |
| 5,002,145 A | 3/1991 | Tsukagoshi |
| 5,005,128 A | 4/1991 | Roberts |
| 5,006,988 A | 4/1991 | Koren |
| 5,020,620 A | 6/1991 | Field |
| 5,023,790 A | 6/1991 | Luke, Jr. |
| 5,040,116 A | 8/1991 | Weiman |
| 5,052,882 A | 10/1991 | Harding |
| 5,053,969 A | 10/1991 | Booth |
| 5,073,749 A | 12/1991 | Kanayama |
| 5,109,940 A | 5/1992 | Yardley |
| 5,111,401 A | 5/1992 | Everett, Jr. |
| 5,125,783 A | 6/1992 | Kawasoe |
| 5,134,353 A | 7/1992 | Kita et al. |
| 5,138,560 A | 8/1992 | Kugler |
| 5,154,249 A | 10/1992 | Yardley |
| 5,164,648 A | 11/1992 | Kita et al. |
| 5,170,351 A | 12/1992 | Nemoto |
| 5,170,352 A | 12/1992 | Sharma |
| 5,179,329 A | 1/1993 | Onishi |
| 5,187,664 A | 2/1993 | Whatcott |
| 5,191,528 A | 3/1993 | Whatcott |
| 5,192,903 A | 3/1993 | Kita et al. |
| 5,199,524 A | 4/1993 | Ivancic |
| 5,202,832 A | 4/1993 | Lisy |
| 5,211,523 A | 5/1993 | Andrada Galan |
| 5,216,605 A | 6/1993 | Whatcott |
| 5,239,249 A | 8/1993 | Ono |
| 5,249,157 A | 9/1993 | Taylor |
| 5,281,901 A | 1/1994 | Yardley |
| 5,305,217 A | 4/1994 | Kita |
| 5,341,130 A | 8/1994 | Yardley |
| 5,387,853 A | 2/1995 | Ono |
| 5,488,277 A | 1/1996 | Onishi |
| 5,505,473 A | 4/1996 | Radcliffe |
| 5,510,984 A | 4/1996 | Markin |
| 5,525,884 A | 6/1996 | Ike |
| 5,545,960 A | 8/1996 | Ishikawa |
| 5,548,512 A | 8/1996 | Quraishi |
| 5,564,890 A | 10/1996 | Knudsen, Jr. |
| 5,568,030 A | 10/1996 | Onishi |
| 5,650,703 A | 7/1997 | Forman |
| 5,669,748 A | 9/1997 | Knudsen, Jr. |
| 5,875,408 A | 2/1999 | Bendett |
| 5,877,962 A | 3/1999 | Radcliffe |
| 5,911,767 A | 6/1999 | Ilic |
| 5,923,270 A | 7/1999 | Rintanen |
| 5,961,559 A | 10/1999 | Moriyama |
| 6,049,745 A | 4/2000 | Douglas |
| 6,058,339 A | 5/2000 | Wakisaka |
| 6,092,010 A | 7/2000 | Drenth |
| 6,246,930 B1 | 6/2001 | Hori |
| 6,256,560 B1 | 7/2001 | Kim |
| 6,345,217 B1 | 2/2002 | Zeitler et al. |
| 6,370,452 B1 | 4/2002 | Pfister |
| 6,377,888 B1 | 4/2002 | Olch |
| 6,459,966 B2 | 10/2002 | Nakano |
| 6,477,463 B2 | 11/2002 | Hamilton |
| 6,481,521 B2 | 11/2002 | Ooishi |
| 6,493,614 B1 | 12/2002 | Jung |
| 6,602,037 B2 | 8/2003 | Winkler |
| 6,615,108 B1 | 9/2003 | Peleg |
| 6,629,028 B2 | 9/2003 | Paromtchik |
| 6,654,647 B1 | 11/2003 | Kal |
| 6,694,216 B1 | 2/2004 | Fujiki |
| 6,721,638 B2 | 4/2004 | Zeitler |
| 6,748,292 B2 | 6/2004 | Mountz |
| 6,772,062 B2 | 8/2004 | Lasky |
| 6,882,910 B2 | 4/2005 | Jeong |
| 6,885,912 B2 | 4/2005 | Peleg |
| 6,895,301 B2 | 5/2005 | Mountz |
| 6,904,343 B2 | 6/2005 | Kang |

(56) References Cited

U.S. PATENT DOCUMENTS

| | | |
|---|---|---|
| 6,950,722 B2 | 9/2005 | Mountz |
| 6,971,464 B2 | 12/2005 | Marino |
| 7,050,891 B2 | 5/2006 | Chen |
| 7,110,855 B2 | 9/2006 | Leishman |
| 7,155,309 B2 | 12/2006 | Peleg |
| 7,305,287 B2 | 12/2007 | Park |
| 7,333,631 B2 | 2/2008 | Park |
| 7,349,759 B2 | 3/2008 | Peleg |
| 7,402,018 B2 | 7/2008 | Amsbury |
| 7,403,120 B2 | 7/2008 | Bridgelall |
| 7,437,226 B2 | 10/2008 | Shim |
| 7,460,016 B2 | 12/2008 | Clott |
| 7,500,448 B1 | 3/2009 | Melhorn |
| 7,505,849 B2 | 3/2009 | Saarikivi |
| 7,548,166 B2 | 6/2009 | Clott |
| 7,557,714 B2 | 7/2009 | Clott |
| 7,599,777 B2 | 10/2009 | Passeri |
| 7,609,175 B2 | 10/2009 | Bonnefoy |
| 7,613,617 B2 | 11/2009 | McElroy |
| 7,616,127 B2 | 11/2009 | Clott |
| 7,634,332 B2 | 12/2009 | McElroy |
| 7,639,142 B2 | 12/2009 | Clott |
| 7,648,329 B2 | 1/2010 | Stevenson |
| 7,656,296 B2 | 2/2010 | Runyon |
| 7,681,796 B2 | 3/2010 | Zimmerman |
| 7,689,001 B2 | 3/2010 | Sihn |
| 7,693,757 B2 | 4/2010 | Zimmerman |
| 7,765,027 B2 | 7/2010 | Hong |
| 7,826,919 B2 | 11/2010 | Dingle |
| 7,835,821 B2 | 11/2010 | Kim |
| 7,840,328 B2 | 11/2010 | Baginski |
| 7,845,560 B2 | 12/2010 | Emanuel |
| 7,850,413 B2 | 12/2010 | Fontana |
| 7,871,234 B2 | 1/2011 | Yuyama |
| 7,873,469 B2 | 1/2011 | D Andrea |
| 7,890,228 B2 | 2/2011 | Werner |
| 7,894,932 B2 | 2/2011 | Mountz |
| 7,894,933 B2 | 2/2011 | Mountz |
| 7,894,939 B2 | 2/2011 | Allen |
| 7,894,951 B2 | 2/2011 | Norris |
| 7,912,574 B2 | 3/2011 | D Andrea |
| 7,912,633 B1 | 3/2011 | Kennedy |
| 7,920,962 B2 | 4/2011 | D Andrea |
| 7,925,514 B2 | 4/2011 | McElroy |
| 7,953,551 B2 | 5/2011 | Park |
| 7,980,808 B2 | 7/2011 | Chilson |
| 7,991,521 B2 | 8/2011 | Stewart |
| 7,996,109 B2 | 8/2011 | Allen |
| 8,010,230 B2 | 8/2011 | Allen |
| 8,020,657 B2 | 9/2011 | Catalfano |
| 8,031,086 B2 | 10/2011 | Dickson |
| 8,068,978 B2 | 11/2011 | D Andrea |
| 8,072,309 B2 | 12/2011 | Duckworth |
| 8,075,243 B2 | 12/2011 | Stevenson |
| 8,146,702 B2 | 4/2012 | Emond |
| 8,160,728 B2 | 4/2012 | Curtis |
| 8,170,711 B2 | 5/2012 | Dingle |
| 8,192,137 B2 | 6/2012 | Chilson |
| 8,193,903 B2 | 6/2012 | Duckworth |
| 8,196,835 B2 | 6/2012 | Emanuel |
| 8,200,423 B2 | 6/2012 | Kennedy |
| 8,204,624 B2 | 6/2012 | Allen |
| 8,210,791 B2 | 7/2012 | Chilson |
| 8,220,710 B2 | 7/2012 | D Andrea |
| 8,229,619 B2 | 7/2012 | Shim |
| 8,239,291 B2 | 8/2012 | Verminski |
| 8,265,873 B2 | 9/2012 | D Andrea |
| 8,269,643 B2 | 9/2012 | Chou |
| 8,271,132 B2 | 9/2012 | Walton |
| 8,280,546 B2 | 10/2012 | Dingle |
| 8,280,547 B2 | 10/2012 | Dingle |
| 8,311,902 B2 | 11/2012 | Mountz |
| 8,369,981 B2 | 2/2013 | Spaulding |
| 8,381,982 B2 | 2/2013 | Emanuel |
| 8,406,949 B2 | 3/2013 | Kondo |
| 8,412,400 B2 | 4/2013 | D Andrea |
| 8,417,444 B2 | 4/2013 | Smid |
| 8,418,919 B1 | 4/2013 | Beyda |
| 8,425,173 B2 | 4/2013 | Lert |
| 8,433,442 B2 | 4/2013 | Friedman |
| 8,433,469 B2 | 4/2013 | Day |
| 8,444,369 B2 | 5/2013 | Bragg |
| 8,452,464 B2 | 5/2013 | Schloemer |
| 8,457,978 B2 | 6/2013 | McElroy |
| 8,473,140 B2 | 6/2013 | Norris |
| 8,483,869 B2 | 7/2013 | Wurman |
| 8,498,734 B2 | 7/2013 | Dunsker |
| 8,515,612 B2 | 8/2013 | Shitamoto |
| 8,538,692 B2 | 9/2013 | D Andrea |
| 8,571,781 B2 | 10/2013 | Bernstein |
| 8,577,551 B2 | 11/2013 | Corbett |
| 8,587,455 B2 | 11/2013 | Porte |
| 8,594,834 B1 | 11/2013 | Clark et al. |
| 8,594,835 B2 | 11/2013 | Toebes |
| 8,606,392 B2 | 12/2013 | D Andrea |
| 8,626,332 B2 | 1/2014 | Dunsker |
| 8,626,335 B2 | 1/2014 | Barbehenn |
| 8,639,382 B1 | 1/2014 | Clark |
| 8,649,899 B2 | 2/2014 | Wurman |
| 8,653,945 B2 | 2/2014 | Lee |
| 8,670,892 B2 | 3/2014 | Yang |
| 8,676,426 B1 | 3/2014 | Murphy |
| 8,700,502 B2 | 4/2014 | Mountz |
| 8,718,814 B1 | 5/2014 | Clark |
| 8,718,815 B2 | 5/2014 | Shimamura |
| 8,725,286 B2 | 5/2014 | Dingle |
| 8,725,317 B2 | 5/2014 | Elston |
| 8,725,362 B2 | 5/2014 | Jensen |
| 8,725,363 B2 | 5/2014 | Jensen |
| 8,731,777 B2 | 5/2014 | Schloemer |
| 8,740,538 B2 | 6/2014 | Lert |
| 8,751,063 B2 | 6/2014 | Wilson |
| 8,751,147 B2 | 6/2014 | Colwell |
| 8,755,936 B2 | 6/2014 | Friedman |
| 8,760,276 B2 | 6/2014 | Yamazato |
| 8,761,989 B1 | 6/2014 | Murphy |
| 8,788,121 B2 | 7/2014 | Klinger |
| 8,798,784 B1 | 8/2014 | Clark |
| 8,798,786 B2 | 8/2014 | Chaitin Pollak |
| 8,798,840 B2 | 8/2014 | Fong |
| 8,805,573 B2 | 8/2014 | Brunner |
| 8,805,574 B2 | 8/2014 | Watt |
| 8,825,257 B2 | 9/2014 | Ozaki |
| 8,825,367 B2 | 9/2014 | Nagasawa |
| 8,831,984 B2 | 9/2014 | Santini |
| 8,862,397 B2 | 10/2014 | Kubota |
| 8,874,300 B2 | 10/2014 | Catalfano |
| 8,874,360 B2 | 10/2014 | Davis |
| 8,880,416 B2 | 11/2014 | McElroy |
| 8,886,385 B2 | 11/2014 | Moriguchi |
| 8,892,240 B1 | 11/2014 | Vliet et al. |
| 8,892,241 B2 | 11/2014 | Weiss |
| 8,909,368 B2 | 12/2014 | D Andrea |
| 8,930,133 B2 | 1/2015 | Barbehenn |
| 8,948,956 B2 | 2/2015 | Takahashi |
| 8,954,188 B2 | 2/2015 | Sullivan et al. |
| 8,965,561 B2 | 2/2015 | Jacobus |
| 8,965,562 B1 | 2/2015 | Wurman |
| 8,965,578 B2 | 2/2015 | Linda |
| 8,970,363 B2 | 3/2015 | Schumacher |
| 8,972,045 B1 | 3/2015 | Wurman |
| 8,983,647 B1 | 3/2015 | Casteel |
| 8,988,285 B2 | 3/2015 | Smid |
| 8,989,918 B2 | 3/2015 | Sturm |
| 9,002,506 B1 | 4/2015 | Shareef |
| 9,002,581 B2 | 4/2015 | Wellman |
| 9,008,827 B1 | 4/2015 | Casteel |
| 9,008,828 B2 | 4/2015 | Worsley |
| 9,008,829 B2 | 4/2015 | Worsley |
| 9,008,830 B2 | 4/2015 | Worsley |
| 9,009,072 B2 | 4/2015 | Durham |
| 9,014,902 B1 | 4/2015 | Murphy |
| 9,020,679 B2 | 4/2015 | Allen |
| 9,026,301 B2 | 5/2015 | Allen |

(56) References Cited

U.S. PATENT DOCUMENTS

| | | |
|---|---|---|
| 9,043,016 B2 | 5/2015 | Schmaltz |
| 9,046,893 B2 | 6/2015 | Douglas |
| 9,051,120 B2 | 6/2015 | Toebes |
| 9,052,714 B2 | 6/2015 | Creasey |
| 9,056,719 B2 | 6/2015 | Tanahashi |
| 9,067,317 B1 | 6/2015 | Wurman |
| 9,073,736 B1 | 7/2015 | Goyal |
| 9,082,293 B2 | 7/2015 | Wellman |
| 9,087,314 B2 | 7/2015 | D Andrea |
| 9,090,214 B2 | 7/2015 | Wilson |
| 9,090,400 B2 | 7/2015 | Barbehenn |
| 9,096,375 B2 | 8/2015 | Lert et al. |
| 9,098,080 B2 | 8/2015 | Norris et al. |
| 9,110,464 B2 | 8/2015 | Holland et al. |
| 9,111,251 B1 * | 8/2015 | Brazeau ............ G06Q 10/087 |
| 9,114,838 B2 | 8/2015 | Bernstein et al. |
| 9,120,621 B1 | 9/2015 | Curlander et al. |
| 9,120,622 B1 | 9/2015 | Elazary et al. |
| 9,122,276 B2 | 9/2015 | Kraimer et al. |
| 9,129,250 B1 | 9/2015 | Sestini et al. |
| 9,134,734 B2 | 9/2015 | Lipkowski et al. |
| 9,146,559 B2 | 9/2015 | Kuss et al. |
| 9,147,173 B2 | 9/2015 | Jones et al. |
| 9,150,263 B2 | 10/2015 | Bernstein et al. |
| 9,152,149 B1 | 10/2015 | Palamarchuk et al. |
| 9,185,998 B1 | 11/2015 | Dwarakanath et al. |
| 9,188,982 B2 | 11/2015 | Thomson |
| 9,193,404 B2 | 11/2015 | Bernstein et al. |
| 9,202,382 B2 | 12/2015 | Klinger et al. |
| 9,206,023 B2 | 12/2015 | Wong et al. |
| 9,207,673 B2 | 12/2015 | Pulskamp et al. |
| 9,207,676 B2 | 12/2015 | Wu et al. |
| 9,211,920 B1 | 12/2015 | Bernstein et al. |
| 9,213,934 B1 | 12/2015 | Versteeg et al. |
| 9,216,745 B2 | 12/2015 | Beardsley et al. |
| 9,218,003 B2 | 12/2015 | Fong et al. |
| 9,218,316 B2 | 12/2015 | Bernstein et al. |
| 9,242,799 B1 | 1/2016 | O'Brien et al. |
| 9,244,463 B2 | 1/2016 | Pfaff et al. |
| 9,248,973 B1 | 2/2016 | Brazeau |
| 9,260,244 B1 | 2/2016 | Cohn |
| 9,266,236 B2 | 2/2016 | Clark et al. |
| 9,268,334 B1 | 2/2016 | Vavrick |
| 9,274,526 B2 | 3/2016 | Murai et al. |
| 9,280,153 B1 | 3/2016 | Palamarchuk et al. |
| 9,280,157 B2 | 3/2016 | Wurman et al. |
| 9,286,590 B2 | 3/2016 | Segawa et al. |
| 9,290,220 B2 | 3/2016 | Bernstein et al. |
| 9,304,001 B2 | 4/2016 | Park et al. |
| 9,310,802 B1 | 4/2016 | Elkins et al. |
| 9,317,034 B2 | 4/2016 | Hoffman et al. |
| 9,329,078 B1 | 5/2016 | Mundhenke et al. |
| 9,329,599 B1 | 5/2016 | Sun et al. |
| 9,330,373 B2 | 5/2016 | Mountz et al. |
| 9,341,720 B2 | 5/2016 | Garin et al. |
| 9,342,811 B2 | 5/2016 | Mountz et al. |
| 9,346,619 B1 | 5/2016 | O'Brien et al. |
| 9,346,620 B2 | 5/2016 | Brunner et al. |
| 9,352,745 B1 | 5/2016 | Theobald |
| 9,355,065 B2 | 5/2016 | Donahue |
| 9,365,348 B1 | 6/2016 | Agarwal et al. |
| 9,367,827 B1 | 6/2016 | Lively et al. |
| 9,367,831 B1 | 6/2016 | Besehanic |
| 9,371,184 B2 | 6/2016 | Dingle et al. |
| 9,378,482 B1 | 6/2016 | Pikler et al. |
| 9,389,609 B1 | 7/2016 | Mountz et al. |
| 9,389,612 B2 | 7/2016 | Bernstein et al. |
| 9,389,614 B2 | 7/2016 | Shani |
| 9,394,016 B2 | 7/2016 | Bernstein et al. |
| 9,395,725 B2 | 7/2016 | Bernstein et al. |
| 9,404,756 B2 | 8/2016 | Fong et al. |
| 9,405,016 B2 | 8/2016 | Yim |
| 9,427,874 B1 | 8/2016 | Rublee |
| 9,429,940 B2 | 8/2016 | Bernstein et al. |
| 9,429,944 B2 | 8/2016 | Filippov et al. |
| 9,436,184 B2 | 9/2016 | D'Andrea et al. |
| 9,440,790 B2 | 9/2016 | Mountz et al. |
| 9,448,560 B2 | 9/2016 | D'Andrea et al. |
| 9,451,020 B2 | 9/2016 | Liu et al. |
| 9,452,883 B1 | 9/2016 | Wurman et al. |
| 9,457,730 B2 | 10/2016 | Bernstein et al. |
| 9,463,927 B1 | 10/2016 | Theobald |
| 9,469,477 B1 | 10/2016 | Palamarchuk et al. |
| 9,471,894 B2 | 10/2016 | Palamarchuk et al. |
| 9,481,410 B2 | 11/2016 | Bernstein et al. |
| 9,493,184 B2 | 11/2016 | Castaneda et al. |
| 9,493,303 B2 | 11/2016 | Wurman et al. |
| 9,495,656 B2 | 11/2016 | Adler et al. |
| 9,501,756 B2 | 11/2016 | Stevens et al. |
| 9,511,934 B2 | 12/2016 | Wurman et al. |
| 9,517,899 B2 | 12/2016 | Watt et al. |
| 9,519,284 B2 | 12/2016 | Wurman et al. |
| 9,519,880 B1 | 12/2016 | Cohn |
| 9,522,817 B2 | 12/2016 | Castaneda et al. |
| 9,523,582 B2 | 12/2016 | Chandrasekar et al. |
| 9,527,710 B2 | 12/2016 | Hussain et al. |
| 9,533,828 B1 | 1/2017 | Dwarakanath et al. |
| 9,536,767 B1 | 1/2017 | Adler et al. |
| 9,540,171 B2 | 1/2017 | Elazary et al. |
| 9,547,945 B2 | 1/2017 | McCabe et al. |
| 9,551,987 B1 | 1/2017 | Mountz et al. |
| 9,563,206 B2 | 2/2017 | Zini et al. |
| 9,568,917 B2 | 2/2017 | Jones et al. |
| 9,582,783 B2 | 2/2017 | Mountz et al. |
| 9,592,961 B2 | 3/2017 | Weiss |
| 9,645,968 B2 | 5/2017 | Elston et al. |
| 9,663,295 B1 | 5/2017 | Wurman et al. |
| 9,663,296 B1 | 5/2017 | Dingle et al. |
| 9,676,552 B2 | 6/2017 | Agarwal et al. |
| 9,679,270 B2 | 6/2017 | Zini et al. |
| 9,694,975 B2 | 7/2017 | Lert et al. |
| 9,694,976 B1 | 7/2017 | Wurman et al. |
| 9,725,239 B2 | 8/2017 | Lert et al. |
| 9,731,896 B2 | 8/2017 | Elazary et al. |
| 9,738,449 B1 | 8/2017 | Palamarchuk et al. |
| 9,740,212 B2 | 8/2017 | D'Andrea et al. |
| 9,766,620 B2 | 9/2017 | Bernstein et al. |
| 9,771,217 B2 | 9/2017 | Lert et al. |
| 9,783,364 B2 | 10/2017 | Worsley |
| 9,785,152 B2 | 10/2017 | Chandrasekar et al. |
| 9,792,577 B2 | 10/2017 | Mountz et al. |
| 9,802,762 B1 | 10/2017 | Pikler et al. |
| 9,836,046 B2 | 12/2017 | Wilson et al. |
| 9,841,758 B2 | 12/2017 | Bernstein et al. |
| 9,856,084 B1 | 1/2018 | Palamarchuk et al. |
| 9,873,561 B2 | 1/2018 | Agarwal et al. |
| 2001/0018637 A1 | 8/2001 | Hamilton |
| 2001/0027360 A1 | 10/2001 | Nakano |
| 2002/0021954 A1 | 2/2002 | Winkler |
| 2002/0027652 A1 | 3/2002 | Paromtchik et al. |
| 2002/0074172 A1 | 6/2002 | Sugiyama et al. |
| 2002/0165648 A1 | 11/2002 | Zeitler |
| 2003/0046021 A1 | 3/2003 | Lasky et al. |
| 2003/0106731 A1 | 6/2003 | Marino et al. |
| 2003/0208304 A1 | 11/2003 | Peless et al. |
| 2004/0006415 A1 | 1/2004 | Kang |
| 2004/0006416 A1 | 1/2004 | Jeong |
| 2004/0010337 A1 | 1/2004 | Mountz |
| 2004/0010339 A1 | 1/2004 | Mountz |
| 2004/0024489 A1 | 2/2004 | Fujiki et al. |
| 2004/0062419 A1 | 4/2004 | Roh et al. |
| 2004/0093116 A1 | 5/2004 | Mountz |
| 2004/0243278 A1 | 12/2004 | Leishman |
| 2005/0065655 A1 | 3/2005 | Hong et al. |
| 2005/0080524 A1 | 4/2005 | Park |
| 2005/0113990 A1 | 5/2005 | Peless et al. |
| 2005/0222722 A1 | 10/2005 | Chen |
| 2005/0228555 A1 | 10/2005 | Roh et al. |
| 2005/0244259 A1 | 11/2005 | Chilson et al. |
| 2006/0071790 A1 | 4/2006 | Duron |
| 2006/0149465 A1 | 7/2006 | Park et al. |
| 2006/0184013 A1 | 8/2006 | Emanuel et al. |
| 2006/0210382 A1 | 9/2006 | Mountz et al. |
| 2006/0245893 A1 | 11/2006 | Schottke |

(56) References Cited

U.S. PATENT DOCUMENTS

| | | |
|---|---|---|
| 2006/0255948 A1 | 11/2006 | Runyon et al. |
| 2006/0255949 A1 | 11/2006 | Roeder et al. |
| 2006/0255950 A1 | 11/2006 | Roeder et al. |
| 2006/0255951 A1 | 11/2006 | Roeder et al. |
| 2006/0255954 A1 | 11/2006 | Sorenson, Jr. et al. |
| 2006/0271274 A1 | 11/2006 | Saarikivi |
| 2006/0280585 A1 | 12/2006 | Passeri et al. |
| 2007/0017984 A1 | 1/2007 | Mountz et al. |
| 2007/0021863 A1 | 1/2007 | Mountz et al. |
| 2007/0021864 A1 | 1/2007 | Mountz et al. |
| 2007/0096922 A1 | 5/2007 | Sorenson, Jr. et al. |
| 2007/0112461 A1 | 5/2007 | Zini et al. |
| 2007/0112463 A1 | 5/2007 | Roh et al. |
| 2007/0123308 A1 | 5/2007 | Kim et al. |
| 2007/0129849 A1 | 6/2007 | Zini et al. |
| 2007/0136152 A1 | 6/2007 | Dunsker et al. |
| 2007/0150109 A1 | 6/2007 | Peless et al. |
| 2007/0152057 A1 | 7/2007 | Cato et al. |
| 2007/0152845 A1 | 7/2007 | Porte et al. |
| 2007/0179690 A1 | 8/2007 | Stewart |
| 2007/0193798 A1 | 8/2007 | Allard et al. |
| 2007/0198144 A1 | 8/2007 | Norris et al. |
| 2007/0198145 A1 | 8/2007 | Norris et al. |
| 2007/0198174 A1 | 8/2007 | Williams et al. |
| 2007/0198175 A1 | 8/2007 | Williams et al. |
| 2007/0198282 A1 | 8/2007 | Williams et al. |
| 2007/0208477 A1 | 9/2007 | Baginski et al. |
| 2007/0219666 A1 | 9/2007 | Filippov et al. |
| 2007/0269299 A1 | 11/2007 | Ross et al. |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2007/0294029 A1 | 12/2007 | D'Andrea et al. |
| 2007/0297879 A1 | 12/2007 | Yuyama et al. |
| 2008/0001372 A1 | 1/2008 | Hoffman et al. |
| 2008/0051984 A1 | 2/2008 | Wurman et al. |
| 2008/0051985 A1 | 2/2008 | D'Andrea et al. |
| 2008/0071429 A1 | 3/2008 | Kraimer et al. |
| 2008/0077511 A1 | 3/2008 | Zimmerman |
| 2008/0129445 A1 | 6/2008 | Kraimer et al. |
| 2008/0157972 A1 | 7/2008 | Duron et al. |
| 2008/0166217 A1 | 7/2008 | Fontana |
| 2008/0167753 A1 | 7/2008 | Peless et al. |
| 2008/0167884 A1 | 7/2008 | Mountz et al. |
| 2008/0167933 A1 | 7/2008 | Hoffman et al. |
| 2008/0189005 A1 | 8/2008 | Chilson et al. |
| 2008/0199298 A1 | 8/2008 | Chilson et al. |
| 2009/0099716 A1 | 4/2009 | Roh et al. |
| 2009/0138151 A1 | 5/2009 | Smid et al. |
| 2009/0185884 A1 | 7/2009 | Wurman et al. |
| 2009/0198376 A1 | 8/2009 | Friedman et al. |
| 2009/0198381 A1 | 8/2009 | Friedman et al. |
| 2009/0234499 A1 | 9/2009 | Nielsen et al. |
| 2010/0039293 A1 | 2/2010 | Porte et al. |
| 2010/0114405 A1 | 5/2010 | Elston et al. |
| 2010/0127883 A1 | 5/2010 | Chou |
| 2010/0138095 A1 | 6/2010 | Redmann, Jr. et al. |
| 2010/0141483 A1 | 6/2010 | Thacher et al. |
| 2010/0145551 A1 | 6/2010 | Pulskamp et al. |
| 2010/0234990 A1 | 9/2010 | Zini et al. |
| 2010/0234991 A1 | 9/2010 | Zini et al. |
| 2010/0266381 A1 | 10/2010 | Chilson et al. |
| 2010/0300841 A1 | 12/2010 | O'Brien |
| 2010/0316468 A1 | 12/2010 | Lert et al. |
| 2010/0316469 A1 | 12/2010 | Lert et al. |
| 2010/0316470 A1 | 12/2010 | Lert et al. |
| 2010/0322746 A1 | 12/2010 | Lert et al. |
| 2010/0322747 A1 | 12/2010 | Lert et al. |
| 2011/0010023 A1 | 1/2011 | Kunzig et al. |
| 2011/0015779 A1 | 1/2011 | D'Andrea et al. |
| 2011/0046813 A1 | 2/2011 | Castaneda et al. |
| 2011/0056760 A1 | 3/2011 | Schendel et al. |
| 2011/0060449 A1 | 3/2011 | Wurman et al. |
| 2011/0066284 A1 | 3/2011 | Curtis |
| 2011/0071718 A1 | 3/2011 | Norris et al. |
| 2011/0103924 A1 | 5/2011 | Watt et al. |
| 2011/0112758 A1 | 5/2011 | D'Andrea et al. |
| 2011/0118903 A1 | 5/2011 | Kraimer et al. |
| 2011/0121068 A1 | 5/2011 | Emanuel et al. |
| 2011/0125312 A1 | 5/2011 | D'Andrea et al. |
| 2011/0130866 A1 | 6/2011 | D'Andrea et al. |
| 2011/0130954 A1 | 6/2011 | D'Andrea et al. |
| 2011/0137457 A1 | 6/2011 | Zini et al. |
| 2011/0153063 A1 | 6/2011 | Wurman et al. |
| 2011/0160949 A1 | 6/2011 | Kondo |
| 2011/0163160 A1 | 7/2011 | Zini et al. |
| 2011/0166721 A1 | 7/2011 | Castaneda et al. |
| 2011/0166737 A1 | 7/2011 | Tanaka et al. |
| 2011/0191135 A1 | 8/2011 | Williams et al. |
| 2011/0208745 A1 | 8/2011 | Dietsch et al. |
| 2011/0270438 A1 | 11/2011 | Shimamura |
| 2012/0038455 A1 | 2/2012 | Kraimer et al. |
| 2012/0041677 A1 | 2/2012 | D'Andrea et al. |
| 2012/0046820 A1 | 2/2012 | Allard et al. |
| 2012/0078471 A1 | 3/2012 | Siefring et al. |
| 2012/0139715 A1 | 6/2012 | Yamazato |
| 2012/0143427 A1 | 6/2012 | Hoffman et al. |
| 2012/0168240 A1 | 7/2012 | Wilson et al. |
| 2012/0168241 A1 | 7/2012 | Bernstein et al. |
| 2012/0173047 A1 | 7/2012 | Bernstein et al. |
| 2012/0173048 A1 | 7/2012 | Bernstein et al. |
| 2012/0173049 A1 | 7/2012 | Bernstein et al. |
| 2012/0173050 A1 | 7/2012 | Bernstein et al. |
| 2012/0176222 A1 | 7/2012 | Baek et al. |
| 2012/0176491 A1 | 7/2012 | Garin et al. |
| 2012/0197477 A1 | 8/2012 | Colwell |
| 2012/0232739 A1 | 9/2012 | Takahashi et al. |
| 2012/0239191 A1 | 9/2012 | Versteeg et al. |
| 2012/0239224 A1 | 9/2012 | McCabe et al. |
| 2012/0239238 A1 | 9/2012 | Harvey et al. |
| 2012/0255810 A1 | 10/2012 | Yang |
| 2012/0282070 A1 | 11/2012 | D'Andrea et al. |
| 2012/0321423 A1 | 12/2012 | MacKnight et al. |
| 2012/0323746 A1 | 12/2012 | Mountz et al. |
| 2012/0330458 A1 | 12/2012 | Weiss |
| 2012/0330492 A1 | 12/2012 | Douglas et al. |
| 2013/0006442 A1 | 1/2013 | Williams et al. |
| 2013/0054005 A1 | 2/2013 | Stevens et al. |
| 2013/0058743 A1 | 3/2013 | Rebstock |
| 2013/0103185 A1 | 4/2013 | Wurman et al. |
| 2013/0103552 A1 | 4/2013 | Hoffman et al. |
| 2013/0105570 A1 | 5/2013 | Dunsker et al. |
| 2013/0110279 A1 | 5/2013 | Dunsker et al. |
| 2013/0110281 A1 | 5/2013 | Jones et al. |
| 2013/0124013 A1 | 5/2013 | Elston et al. |
| 2013/0124014 A1 | 5/2013 | Elston et al. |
| 2013/0131895 A1 | 5/2013 | Elston et al. |
| 2013/0131910 A1 | 5/2013 | Takahashi et al. |
| 2013/0158773 A1 | 6/2013 | Wu et al. |
| 2013/0166108 A1 | 6/2013 | Sturm |
| 2013/0173049 A1 | 7/2013 | Brunner et al. |
| 2013/0173089 A1 | 7/2013 | Bernstein et al. |
| 2013/0190963 A1 | 7/2013 | Kuss et al. |
| 2013/0197720 A1 | 8/2013 | Kraimer et al. |
| 2013/0197760 A1 | 8/2013 | Castaneda et al. |
| 2013/0204429 A1 | 8/2013 | D'Andrea et al. |
| 2013/0204480 A1 | 8/2013 | D'Andrea et al. |
| 2013/0211626 A1 | 8/2013 | Nagasawa |
| 2013/0238170 A1 | 9/2013 | Klinger |
| 2013/0246229 A1 | 9/2013 | Mountz et al. |
| 2013/0251480 A1 | 9/2013 | Watt et al. |
| 2013/0275045 A1 | 10/2013 | Tsujimoto et al. |
| 2013/0282222 A1 | 10/2013 | Ozaki et al. |
| 2013/0297151 A1 | 11/2013 | Castaneda et al. |
| 2013/0302132 A1 | 11/2013 | D'Andrea et al. |
| 2013/0304253 A1 | 11/2013 | Wurman et al. |
| 2013/0325243 A1 | 12/2013 | Lipkowski et al. |
| 2013/0338874 A1 | 12/2013 | Donahue |
| 2013/0338885 A1 | 12/2013 | Kirk et al. |
| 2013/0338886 A1 | 12/2013 | Callea et al. |
| 2014/0005933 A1 | 1/2014 | Fong et al. |
| 2014/0020964 A1 | 1/2014 | Bernstein et al. |
| 2014/0032035 A1 | 1/2014 | Thomson |
| 2014/0067184 A1 | 3/2014 | Murphy |

(56) References Cited

U.S. PATENT DOCUMENTS

| | | |
|---|---|---|
| 2014/0072392 A1 | 3/2014 | Tanahashi |
| 2014/0081505 A1 | 3/2014 | Klinger et al. |
| 2014/0088758 A1 | 3/2014 | Lert et al. |
| 2014/0100690 A1 | 4/2014 | Wurman et al. |
| 2014/0100715 A1 | 4/2014 | Mountz et al. |
| 2014/0100998 A1 | 4/2014 | Mountz et al. |
| 2014/0100999 A1 | 4/2014 | Mountz et al. |
| 2014/0107833 A1 | 4/2014 | Segawa et al. |
| 2014/0124462 A1 | 5/2014 | Yamashita |
| 2014/0135977 A1 | 5/2014 | Wurman et al. |
| 2014/0172223 A1 | 6/2014 | Murphy |
| 2014/0188671 A1 | 7/2014 | Mountz et al. |
| 2014/0195040 A1 | 7/2014 | Wurman et al. |
| 2014/0195121 A1 | 7/2014 | Castaneda et al. |
| 2014/0214195 A1 | 7/2014 | Worsley |
| 2014/0214196 A1 | 7/2014 | Worsley |
| 2014/0214234 A1 | 7/2014 | Worsley |
| 2014/0228999 A1 | 8/2014 | D'Andrea et al. |
| 2014/0236393 A1 | 8/2014 | Bernstein et al. |
| 2014/0236413 A1 | 8/2014 | D'Andrea et al. |
| 2014/0238762 A1 | 8/2014 | Berberian et al. |
| 2014/0244097 A1 | 8/2014 | Colwell |
| 2014/0271063 A1 | 9/2014 | Lert et al. |
| 2014/0277691 A1 | 9/2014 | Jacobus et al. |
| 2014/0297093 A1 | 10/2014 | Murai et al. |
| 2014/0303773 A1 | 10/2014 | Wurman et al. |
| 2014/0330425 A1 | 11/2014 | Stevens et al. |
| 2014/0330426 A1 | 11/2014 | Brunner et al. |
| 2014/0343714 A1 | 11/2014 | Clark et al. |
| 2014/0343758 A1 | 11/2014 | Kraimer et al. |
| 2014/0345957 A1 | 11/2014 | Bernstein et al. |
| 2014/0350768 A1 | 11/2014 | Filippov et al. |
| 2014/0350831 A1 | 11/2014 | Hoffman et al. |
| 2014/0371973 A1 | 12/2014 | Pfaff et al. |
| 2015/0012209 A1 | 1/2015 | Park et al. |
| 2015/0019043 A1 | 1/2015 | Creasey et al. |
| 2015/0022400 A1 | 1/2015 | Smid et al. |
| 2015/0025713 A1 | 1/2015 | Klinger et al. |
| 2015/0057843 A1 | 2/2015 | Kraimer et al. |
| 2015/0066283 A1 | 3/2015 | Wurman et al. |
| 2015/0073586 A1 | 3/2015 | Weiss |
| 2015/0073589 A1* | 3/2015 | Khodl ................ B25J 5/007 700/218 |
| 2015/0088302 A1 | 3/2015 | Mountz et al. |
| 2015/0117995 A1 | 4/2015 | D'Andrea et al. |
| 2015/0142168 A1 | 5/2015 | Holland et al. |
| 2015/0151912 A1 | 6/2015 | Mountz et al. |
| 2015/0183581 A1 | 7/2015 | Worsley |
| 2015/0224941 A1 | 8/2015 | Bernstein et al. |
| 2015/0226560 A1 | 8/2015 | Chandrasekar et al. |
| 2015/0226561 A1 | 8/2015 | Chandrasekar et al. |
| 2015/0227862 A1 | 8/2015 | Chandrasekar et al. |
| 2015/0227885 A1 | 8/2015 | Zini et al. |
| 2015/0234386 A1 | 8/2015 | Zini et al. |
| 2015/0261223 A1 | 9/2015 | Fong et al. |
| 2015/0266672 A1 | 9/2015 | Lert et al. |
| 2015/0284010 A1 | 10/2015 | Beardsley et al. |
| 2015/0286218 A1 | 10/2015 | Shani |
| 2015/0301532 A1 | 10/2015 | Norris et al. |
| 2015/0307278 A1 | 10/2015 | Wickham et al. |
| 2015/0344085 A1 | 12/2015 | Bernstein et al. |
| 2015/0355639 A1 | 12/2015 | Versteeg et al. |
| 2015/0362919 A1 | 12/2015 | Bernstein et al. |
| 2015/0370257 A1 | 12/2015 | Bernstein et al. |
| 2015/0371181 A1 | 12/2015 | Palamarchuk et al. |
| 2016/0004253 A1 | 1/2016 | Bernstein et al. |
| 2016/0021178 A1 | 1/2016 | Liu et al. |
| 2016/0033967 A1 | 2/2016 | Bernstein et al. |
| 2016/0033971 A1 | 2/2016 | Thomson |
| 2016/0042314 A1 | 2/2016 | Mountz et al. |
| 2016/0048130 A1 | 2/2016 | Vavrick |
| 2016/0054734 A1 | 2/2016 | Bernstein et al. |
| 2016/0069691 A1 | 3/2016 | Fong |
| 2016/0090133 A1 | 3/2016 | Bernstein et al. |
| 2016/0097862 A1 | 4/2016 | Yim |
| 2016/0101741 A1 | 4/2016 | Bernstein et al. |
| 2016/0101937 A1 | 4/2016 | Adler et al. |
| 2016/0103014 A1 | 4/2016 | Mundhenke et al. |
| 2016/0117936 A1 | 4/2016 | Klinger et al. |
| 2016/0147231 A1 | 5/2016 | Sun et al. |
| 2016/0171441 A1 | 6/2016 | Lively et al. |
| 2016/0176637 A1 | 6/2016 | Ackerman et al. |
| 2016/0185526 A1 | 6/2016 | Lert et al. |
| 2016/0187886 A1 | 6/2016 | Jones et al. |
| 2016/0202696 A1 | 7/2016 | Bernstein et al. |
| 2016/0203543 A1 | 7/2016 | Snow |
| 2016/0232477 A1 | 8/2016 | Cortes et al. |
| 2016/0232490 A1 | 8/2016 | Mountz et al. |
| 2016/0246299 A1 | 8/2016 | Berberian et al. |
| 2016/0264357 A1 | 9/2016 | Agarwal et al. |
| 2016/0282871 A1 | 9/2016 | Bernstein et al. |
| 2016/0291591 A1 | 10/2016 | Bernstein et al. |
| 2016/0304280 A1 | 10/2016 | Elazary et al. |
| 2016/0304281 A1 | 10/2016 | Elazary et al. |
| 2016/0334799 A1 | 11/2016 | D'Andrea et al. |
| 2016/0339587 A1 | 11/2016 | Rublee |
| 2016/0347545 A1 | 12/2016 | Lindbo et al. |
| 2016/0349748 A1 | 12/2016 | Bernstein et al. |
| 2016/0379161 A1 | 12/2016 | Adler et al. |
| 2017/0011336 A1 | 1/2017 | Stevens et al. |
| 2017/0022010 A1 | 1/2017 | D'Andrea et al. |
| 2017/0038770 A1 | 2/2017 | Wurman et al. |
| 2017/0043953 A1* | 2/2017 | Battles ................ B65G 1/1373 |
| 2017/0052033 A1 | 2/2017 | Fong et al. |
| 2017/0057798 A1 | 3/2017 | Dues et al. |
| 2017/0060138 A1 | 3/2017 | Chandrasekar et al. |
| 2017/0080352 A1 | 3/2017 | Bernstein et al. |
| 2017/0174431 A1* | 6/2017 | Borders ................ B65G 65/00 |
| 2017/0183005 A1 | 6/2017 | Elston et al. |
| 2017/0183159 A1 | 6/2017 | Weiss |
| 2017/0269608 A1 | 9/2017 | Chandrasekar et al. |
| 2017/0286908 A1 | 10/2017 | Lively et al. |
| 2017/0313517 A1 | 11/2017 | Agarwal et al. |
| 2017/0362032 A1 | 12/2017 | Sullivan et al. |
| 2018/0016098 A1 | 1/2018 | Lert et al. |

FOREIGN PATENT DOCUMENTS

| | | |
|---|---|---|
| CA | 1228142 A | 10/1987 |
| CA | 1238103 A | 6/1988 |
| CA | 1264490 A | 1/1990 |
| CA | 1267866 A | 4/1990 |
| CA | 1269740 A | 5/1990 |
| CA | 1271544 A | 7/1990 |
| CA | 1275721 C | 10/1990 |
| CA | 1276264 C | 11/1990 |
| CA | 2029773 A1 | 5/1991 |
| CA | 1291725 C | 11/1991 |
| CA | 2036104 A1 | 11/1991 |
| CA | 2042133 A1 | 1/1992 |
| CA | 2049578 A1 | 2/1992 |
| CA | 2296837 A1 | 2/1992 |
| CA | 2094833 A1 | 4/1992 |
| CA | 1304043 C | 6/1992 |
| CA | 2095442 A1 | 6/1992 |
| CA | 1304820 C | 7/1992 |
| CA | 1323084 C | 10/1993 |
| CA | 2189853 A1 | 11/1995 |
| CA | 2244668 A1 | 3/1999 |
| CA | 2469652 A1 | 6/2003 |
| CA | 2514523 A1 | 8/2004 |
| CA | 2565553 A1 | 11/2005 |
| CA | 2577346 A1 | 4/2006 |
| CA | 2613180 A1 | 1/2007 |
| CA | 2921584 A1 | 1/2007 |
| CA | 2625885 A1 | 4/2007 |
| CA | 2625895 A1 | 4/2007 |
| CA | 2837477 A1 | 4/2007 |
| CA | 2864027 A1 | 4/2007 |
| CA | 2636233 A1 | 7/2007 |
| CA | 2640769 A1 | 8/2007 |
| CA | 2652114 A1 | 12/2007 |
| CA | 2654258 A1 | 12/2007 |
| CA | 2654260 A1 | 12/2007 |

(56) References Cited

FOREIGN PATENT DOCUMENTS

| | | | |
|---|---|---|---|
| CA | 2654263 | A1 | 12/2007 |
| CA | 2654295 | A1 | 12/2007 |
| CA | 2654336 | A1 | 12/2007 |
| CA | 2654471 | A1 | 12/2007 |
| CA | 2748398 | A1 | 12/2007 |
| CA | 2748407 | A1 | 12/2007 |
| CA | 2750043 | A1 | 12/2007 |
| CA | 2781624 | A1 | 12/2007 |
| CA | 2781857 | A1 | 12/2007 |
| CA | 2838044 | A1 | 12/2007 |
| CA | 2866664 | A1 | 12/2007 |
| CA | 2921134 | A1 | 12/2007 |
| CA | 2663578 | A1 | 4/2008 |
| CA | 2860745 | A1 | 4/2008 |
| CA | 2671955 | A1 | 7/2008 |
| CA | 2673025 | A1 | 7/2008 |
| CA | 2674241 | A1 | 7/2008 |
| CA | 2691710 | A1 | 12/2008 |
| CA | 2721345 | A1 | 10/2009 |
| CA | 2760127 | A1 | 11/2009 |
| CA | 2760225 | A1 | 11/2009 |
| CA | 2743706 | A1 | 6/2010 |
| CA | 2754626 | A1 | 9/2010 |
| CA | 2765565 | A1 | 1/2011 |
| CA | 2932535 | A1 | 1/2011 |
| CA | 2932537 | A1 | 1/2011 |
| CA | 2770139 | A1 | 2/2011 |
| CA | 2773963 | A1 | 3/2011 |
| CA | 2778111 | A1 | 5/2011 |
| CA | 2784874 | A1 | 7/2011 |
| CA | 2868578 | A1 | 7/2011 |
| CA | 2806852 | A1 | 2/2012 |
| CA | 2823715 | A1 | 7/2012 |
| CA | 2827281 | A1 | 8/2012 |
| CA | 2827735 | A1 | 8/2012 |
| CA | 2770715 | A1 | 9/2012 |
| CA | 2770918 | A1 | 9/2012 |
| CA | 2831832 | A1 | 10/2012 |
| CA | 2836933 | A1 | 12/2012 |
| CA | 2851774 | A1 | 4/2013 |
| CA | 2799871 | A1 | 6/2013 |
| CA | 2866708 | A1 | 9/2013 |
| CA | 2938894 | A1 | 9/2013 |
| CA | 2813874 | A1 | 12/2013 |
| CA | 2824189 | A1 | 2/2014 |
| CA | 2870381 | A1 | 4/2014 |
| CA | 2935223 | A1 | 4/2014 |
| CA | 2894546 | A1 | 6/2014 |
| CA | 2845229 | A1 | 9/2014 |
| CA | 2899553 | A1 | 10/2014 |
| CA | 2882452 | A1 | 8/2015 |
| CA | 2886121 | A1 | 10/2015 |
| WO | 2012154872 | A2 | 11/2012 |
| WO | 2016015000 | A2 | 1/2016 |

OTHER PUBLICATIONS

US 9,791,858 B2, 10/2017, Wilson et al. (withdrawn)
"Warehouse Robots at Work", IEEE Spectrum, Jul. 21, 2008. YouTube https://www.youtube.com/watch?v=IWsMdN7HMuA. (see attached PDF screenshots).*
International Search Report and Written Opinion, PCT/US2017/054627, dated Jan. 5, 2018 (15 pages).
International Search Report and Written Opinion, PCT/US2018/012645, dated Mar. 7, 2018 (13 pages).
International Search Report and Written Opinion, PCT/US2018/012641, dated Mar. 7, 2018 (17 pages).
US 7,460,017, 12/2008, (withdrawn)
US 9,050,932, 6/2015, (withdrawn)

* cited by examiner

HYBRID MODULAR STORAGE FETCHING SYSTEM

CROSS-REFERENCE TO RELATED APPLICATIONS

This application claims the benefit under 35 U.S.C. § 119(e) of U.S. Provisional Application No. 62/403,001, entitled "Modular Storage Fetching System (MSFS)," filed on Sep. 30, 2016, the entire contents of which are incorporated herein by reference.

BACKGROUND

This application relates to inventory management systems (e.g., order distribution or fulfillment systems).

Some current inventory management systems use drag-along carts on which human agents (pickers) place items they select (pick) to fulfill orders. In a zone-less pick-to-cart system an agent drags his/her cart from location to location as instructed by the computer system of the facility. The cart can accommodate multiple orders and typically is equipped with dedicated containers or cartons that are keyed to the orders being fulfilled by the agent during that cart load. In some cases, the agent wears a headset and/or is provided a terminal, such as a mobile computing device, via which the agent is provided ordered, item-by-item instructions on which items to pick. As the agent walks around the facility among the different fixed shelving units, he/she drags or pushes his/her cart manually. During a given shift, the agent may end up considerably fatigued from having to propel the cart around the warehouse.

Further, some current inventory management systems divide inventory into a series of zones and assign a human agent to a zone. The systems may use a conveyor belt to move orders across the zones as controlled by the computer system of the facility. In some cases, the agent wears a headset and/or is provided a terminal, such as a mobile computing device, via which the agent is provided ordered, item-by-item instructions on which items to pick. In some cases, pick-to-light systems use light displays to direct operators to product locations. Each product location has a numeric or alphanumeric display with a light, an acknowledgement button, and a digital readout for indicating quantity.

Further, some current inventory management or distribution systems use a "goods-to-person" approach where the items to be picked by a human agent are brought to a predetermined location to eliminate the amount of walking the human agent must do within a facility and/or expedite the picking of the items by the picker. Once picked, these items are packaged and dispatched. While these systems may, in certain use cases, adequately maneuver the items to the stations at which they are to be picked, they are less effective for high-volume and/or high-velocity goods because they have to continually return the same goods to the picking stations during the course of a day.

SUMMARY

A system can be configured to perform particular operations or actions by virtue of having software, firmware, hardware, or a combination of them installed on the system that in operation causes or cause the system to perform the actions. One general aspect includes a method including: generating, by one or more computing devices, a picking schedule including pick-to-cart routing based on order data, the order data including one or more first identification codes representing one or more first items located in a pick-to-cart area of a distribution facility; transmitting, by the one or more computing devices, a signal including the picking schedule to an automated guided vehicle (AGV) dispatching system; dispatching, by the AGV dispatching system, a cart AGV according to the picking schedule, the cart AGV including a drive unit adapted to provide motive force to the cart AGV and a guidance system adapted to locate the cart AGV in the distribution facility, the cart AGV adapted to autonomously transport cartons, the cartons adapted to hold items; autonomously navigating, by the one or more computing devices, the cart AGV through the pick-to-cart area according to the pick-to-cart routing to allow picking of the one or more first items located in the pick-to-cart area; and autonomously navigating, by the one or more computing devices, the cart AGV to a pick-cell station according to the pick-to-cart routing. Other embodiments of this aspect include corresponding computer systems, apparatus, and computer programs recorded on one or more computer storage devices, each configured to perform the actions of the methods.

Implementations may include one or more of the following features. The method may also include that the order data includes one or more second identification codes representing one or more second items located in a high-density storage area of the distribution facility. The method may also include that the picking schedule includes modular storage fetching (MSF) routing. The method may also include dispatching, by the AGV dispatching system, an MSF AGV according to the picking schedule, the MSF AGV including a drive unit adapted to provide motive force to the MSF AGV, a guidance system adapted to locate the MSF AGV in the distribution facility, and a modular storage unit holder adapted to hold modular storage units, the MSF AGV adapted autonomously retrieve one or more modular storage units from the high-density storage area and transport the one or more modular storage units to the pick-cell station, autonomously navigating, by the one or more computing devices, the MSF AGV to a location of the one or more modular storage units in the high-density storage area, the one or more modular storage units containing the one or more second items, and autonomously retrieving, by the MSF AGV, the one or more modular storage units from the high-density storage area. The method may further include autonomously navigating, by the one or more computing devices, the MSF AGV from the location of the one or more modular storage units in the high-density storage area to the pick-cell station according to the MSF routing. The method may also include autonomously navigating the MSF AGV to the location of the one or more modular storage units in the high-density storage area includes autonomously navigating the MSF AGV to a first location of a first modular storage unit in the high-density storage area, the first modular storage unit containing a first particular item of the one or more second items, and autonomously navigating the MSF AGV from the first location of the first modular storage unit to a second location of a second modular storage unit, the second modular storage unit containing a second particular item of the one or more second items. The method may also include autonomously retrieving, by the MSF AGV, the one or more modular storage units, autonomously retrieving, by the MSF AGV, the first modular storage unit from the first location of the first modular storage unit in the high-density storage area, and autonomously retrieving, by the MSF AGV, the second modular storage unit from the second location of the second modular storage unit. The method where the second location of the second modular storage unit is a second pick-cell station. The method where the second location of the second modular storage unit is a different location of the high-density storage area than the first location of the first modular storage unit. The method may also include autonomously navigating the MSF AGV from the location of the one or more modular storage units in the high-density storage area to the pick-cell station. The method may also include autonomously delivering, by the MSF AGV, the first modular storage unit to the pick-cell station. The method where the MSF AGV is further adapted to stage the one or more modular storage units at a staging area of the pick-cell station. The method where the MSF AGV is adapted to retrieve multiple sizes of modular storage units. The method may also include that the one or more modular storage include and a holding structure adapted to hold items, the holding structure adapted to interface with a retrieval mechanism of the MSF AGV. The method may also include that the MSF AGV includes the retrieval mechanism adapted to interface with the holding structure to retrieve a given modular storage unit from a modular storage unit support structure and place the given modular storage unit in the modular storage unit holder. The method may also include that the retrieval mechanism of the MSF AGV includes a fork coupled with the MSF AGV and is configured to lift the given modular storage unit and remove the given modular storage unit from the modular storage unit support structure. The method may also include that the modular storage unit support structure includes a shelf. The method may also include that the modular storage unit holder of the MSF AGV is adapted to hold a plurality of modular storage units. The method may also include that the modular storage unit holder of the MSF AGV includes a plurality of bays, each bay adapted to hold a modular storage unit. The method may also include that the retrieval mechanism is adapted to place the given modular storage unit in any of the plurality of bays. The method where the pick-cell station includes an output device configured to provide picking instructions to a picker, the picking instructions indicating to the picker which of the one or more second items from the one or more modular storage units to place in a given carton held on the cart AGV. The system further including an MSF AGV including a drive unit adapted to provide motive force to the MSF AGV, a guidance system adapted to locate the MSF AGV in the distribution facility, and a modular storage unit holder adapted to hold modular storage units, the MSF AGV adapted autonomously retrieve one or more modular storage units from the high-density storage area and transport the one or more modular storage units to the pick-cell station. The system where the MSF AGV is further configured to autonomously navigate to a location of the one or more modular storage units in the high-density storage area, the one or more modular storage units containing a second item, and autonomously retrieve the one or more modular storage units from the high-density storage area. The system where the MSF AGV is further configured to autonomously navigate from the location of the one or more modular storage units in the high-density storage area to the pick-cell station, and autonomously deliver the one or more modular storage units to the pick-cell station. The system where the AGV dispatching system is further configured to dispatch a MSF AGV according to the picking schedule. Implementations of the described techniques may include hardware, a method or process, or computer software on a computer-accessible medium.

Another general aspect includes a method including: dispatching, by an AGV dispatching system, a cart AGV according to a picking schedule, the cart AGV including a drive unit adapted to provide motive force to the cart AGV and a guidance system adapted to locate the cart AGV in a distribution facility, the cart AGV adapted to autonomously transport cartons, the cartons adapted to hold items; dispatching, by the AGV dispatching system, a MSF AGV according to the picking schedule, the MSF AGV including a drive unit adapted to provide motive force to the MSF AGV and a guidance system adapted to locate the MSF AGV in the distribution facility, the MSF AGV adapted to hold a plurality of modular storage units and retrieve the plurality of modular storage units from a high-density storage area and transport the plurality of modular storage units to a pick-cell station; autonomously navigating, by the one or more computing devices, the cart AGV through a pick-to-cart area according to the picking schedule to retrieve a first item located in the pick-to-cart area; autonomously navigating, by the one or more computing devices, the cart AGV to the pick-cell station according to the picking schedule; autonomously navigating the MSF AGV to a first location of a first modular storage unit in the high-density storage area, the first modular storage unit containing a second item; autonomously retrieving, by the MSF AGV, the first modular storage unit from the first location; autonomously navigating the MSF AGV from the first location to a second location of a second modular storage unit, the second modular storage unit containing a third item; autonomously retrieving, by the MSF AGV, the second modular storage unit from the second location; and autonomously delivering, by the MSF AGV, the first modular storage unit and the second modular storage unit to the pick-cell station. Other embodiments of this aspect include corresponding computer systems, apparatus, and computer programs recorded on one or more computer storage devices, each configured to perform the actions of the methods.

Another general aspect includes a system including: a warehouse execution system adapted to generate a picking schedule including pick-to-cart routing based on order data, the order data including one or more first identification codes representing one or more first items located in a pick-to-cart area of a distribution facility, and transmit a signal including the picking schedule to an AGV dispatching system; an AGV dispatching system adapted to dispatch a cart AGV according to the picking schedule, the cart AGV including a drive unit adapted to provide motive force to the cart AGV and a guidance system adapted to locate the cart AGV in the distribution facility, the cart AGV adapted to autonomously transport cartons, the cartons adapted to hold items; and the cart AGV adapted to autonomously navigate through the pick-to-cart area according to the pick-to-cart routing to retrieve the one or more first items located in the pick-to-cart area, autonomously navigate to a pick-cell station according to the pick-to-cart routing. Other embodiments of this aspect include corresponding computer systems, apparatus, and computer programs recorded on one or more computer storage devices, each configured to perform the actions of the methods.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Among other benefits, the technology described herein improves upon that described in the Background Section. For instance, the technology provides robotic devices, systems, methods, and other aspects that can more efficiently process goods (e.g., items or items in a distribution facility) based on demand. Further, the technology can reduce the amount of irrelevant items carried simultaneously with relevant items by providing automated guided vehicle(s) (AGV(s)) that are configured to efficiently carry items.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

The technology described herein can be integrated into any logistics system, dispatch system 106, warehouse execution system 102, warehouse management system 104, etc., to coordinate the provision of to-be-picked items in a hybrid modular storage fetching system. This technology beneficially improves productivity and throughput, increases asset utilization, and lowers cycle time and labor costs. These benefits, in turn, lead to shorter delivery times and result in significant savings and business value.

Figure 1:
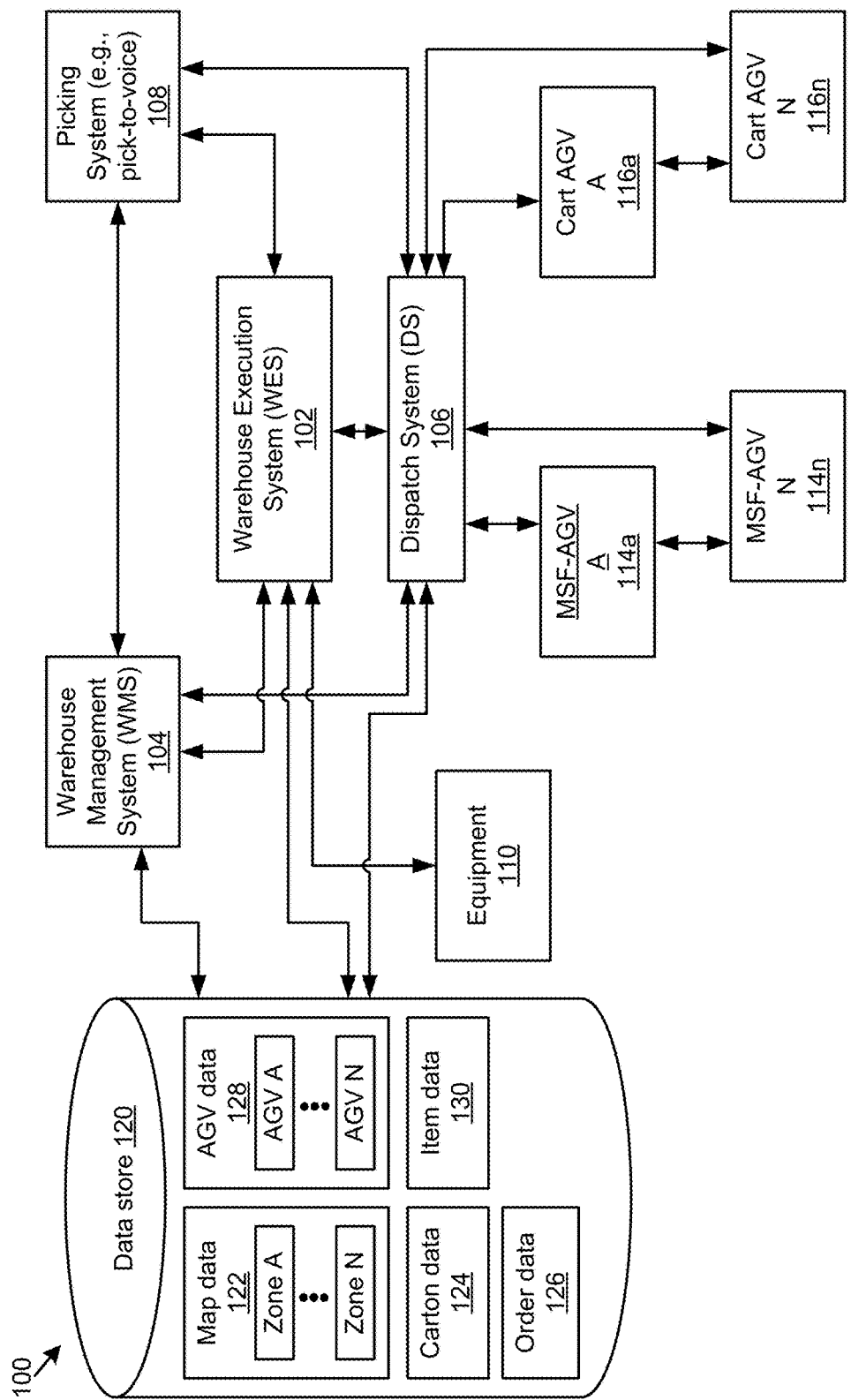
FIG. 1 is a block diagram of an example system and data communication flow for a hybrid modular storage fetching system.

FIG. 1 depicts an example system 100 and data communication flow for implementing a hybrid modular storage fetching system. The system 100 includes a warehouse execution system (WES) 102. The WES 102 is coupled to equipment 110 (e.g., conveyor controls, conveyor scanners, conveyors, automated induction equipment, other warehouse equipment, etc.), a warehouse management system (WMS) 104, a data store 120 storing warehouse management, execution, dispatch, picking, carton, order, item, AGV, map, and/or other data, a picking system 108 (e.g., pick-to-voice, pick-to-light, etc.), and a dispatch system 106.

The WES 102 may, in some embodiments, include one or more hardware and/or virtual servers programmed to perform the operations, acts, and/or functionality described herein. For instance, the WES 102 may include an AGV management engine and a SKU routing engine. These components may comprise software routines storable in one or more non-transitory memory devices and executable by one or more computer processors of the WES 102 to carry out the operations, acts, and/or functionality described herein. In further embodiments, these routines, or a portion thereof, may be embodied in electrical hardware that is operable to carry out the operations, acts, and/or functionality described herein.

The AGV management engine is executable to generate a schedule that defines the route for an AGV during a picking session, as described herein. For a given cart AGV 116a . . . 116n, depending on the items (e.g., identified by stock keeping units or SKUS) to be placed in the cartons of that cart, the AGV management engine generates a schedule and transmits it to the dispatch system 106, which in turn deploys a cart AGV 116 according to the schedule, for instance. In some implementations, the dispatch system 106 instructs the AGV to proceed through one or more of the picking zones of the distribution facility according to the schedule. The schedule of each of the AGVs may be coordinated such that an optimal flow can be achieved, as discussed elsewhere herein.

The SKU (e.g., a stock keeping unit or unique identifier identifying an item) routing engine is executable to route items into different storage zones depending based on picking profiles of the items, which may be stored and maintained as item data 130. The SKU routing engine dynamically monitors the picking activity in the distribution facility, tracks which items have the highest volume or velocity for a given timeframe, stores the tracking data in the data store 120, and can instruct the AGV management engine to have items relocated by AGVs to different storage locations in the distribution facility based on the tracked picking activity.

A picking profile of a given item can change over time as demand for the item changes. The demand for a given item may be random or predicable (e.g., seasonal), and may change based on time of day, week, month, year, etc. The item routing engine may maintain the picking profile in the database as item data 130, and utilize that data to determine in which zone of the distribution facility to store the item.

Advantageously, based on the picking profiles (e.g., velocity and volume), the SKU routing engine may provide a distinct automated application for picking. In some implementations, the SKU routing engine may continually algorithmically evaluate the picking profile of each SKU and instruct the WES 102 and dispatch system 106 to transfer/relocate items to another storage location and/or picking area, swap item locations, etc., when necessary to maintain the most expedient flow in the facility. This advantageously reduces capital associated with fully automated high velocity items and reduces replenishment complexity.

The WES 102 may store productivity information for points in the distribution facility in a database (e.g., a non-transitory data store 120). The productivity information may reflect mechanical capacity of that given point of the AGV system. In some cases, the mechanical capacity may be dynamic based on current conditions (e.g., system health, staffing levels (e.g., number of associates working in zone), stock levels, operational state, etc.).

In some embodiments, the WMS 104 and/or WES 102 may algorithmically analyze the configuration of a cart AGV 116 depending on items that are set for distribution/fulfillment in the next picking time window. The WMS 104 and/or WES 102 may generate a stocking list for the cart based on hub, priority, pick density, pick zone demand, and item-to-item affinity, etc. The AGV management engine may use the stocking list when generating the schedule for the cart AGV 116.

The dispatch system 106 may be electronically communicatively coupled to a plurality of AGVs. The dispatch system 106 includes hardware and software configured to dispatch the AGVs, and is coupled for communication with the WES 102 and WMS 104 to receive instructions and provide data. The dispatch system 106 calculates a route to execute the task considering traffic and resources. In some cases it adjusts the route or the task in order to keep the route optimum.

The AGVs are robotic vehicles including drive units providing motive force for moving the AGVs (and, in some instances, carts, modular storage units 602, etc.), guidance systems for determining position of the AGVs within the distribution facility, and equipment for carrying items. The equipment for carrying items may include carton holders or modular storage unit holders (e.g., carts, shelves, etc.), for example, as described in further detail in reference to FIGS. 5A-7I. FIGS. 5A-7I depict types of AGVs, such as modular storage fetching (MSF) AGVs 114 and cart AGVs 116.

Figure 3A:
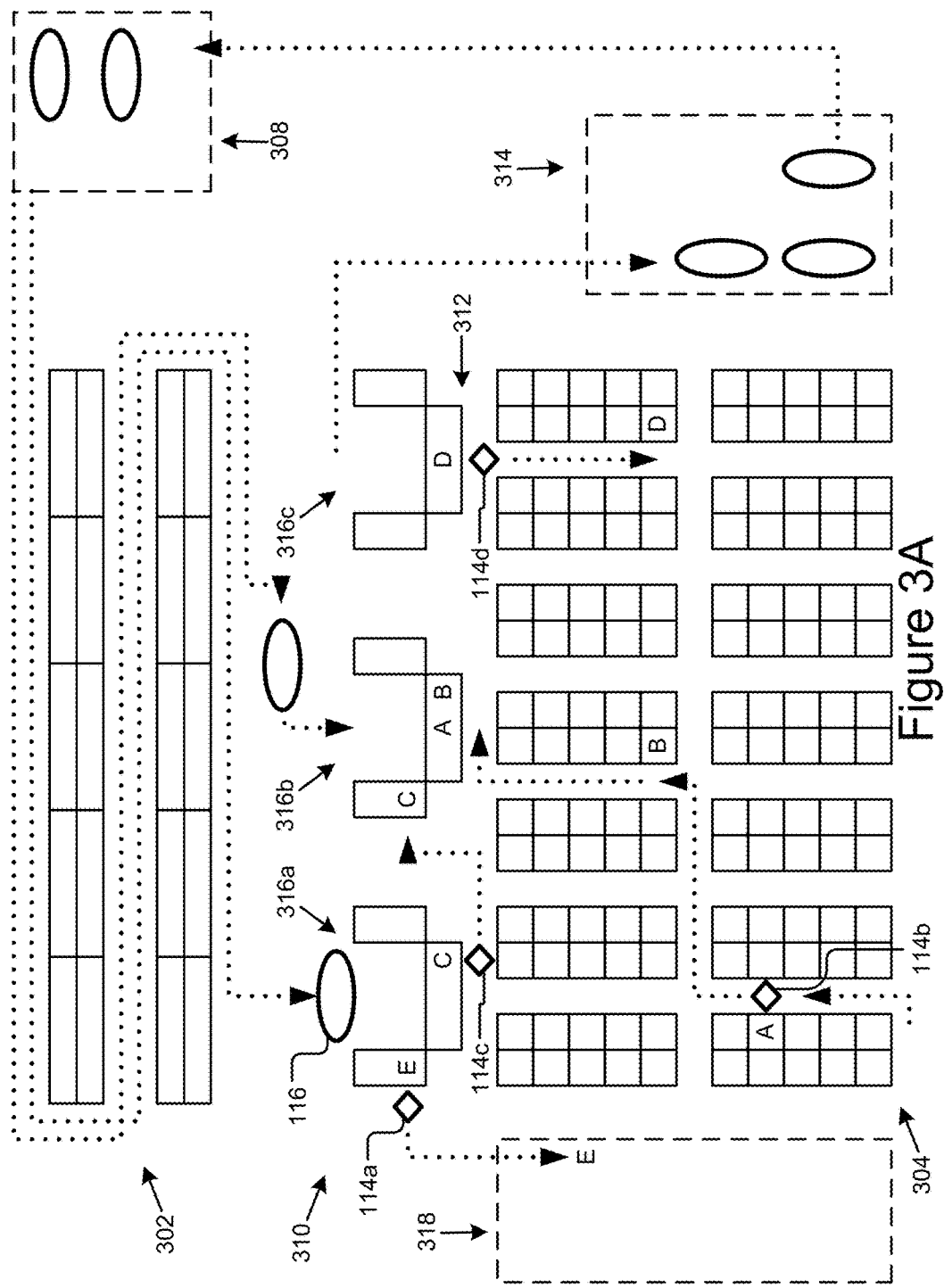
FIG. 3A is a schematic of an example configuration of a distribution facility layout in a hybrid modular storage fetching system.

A cart AGV 116 is an automated guided vehicle or robot configured to autonomously transport pick-to-cart items from a pick-to-cart area 302 of the distribution facility to a pick-cell station 316 and/or finalizing area 314 (e.g., as described in reference to FIG. 3A). The cart AGV 116 may include a drive unit adapted to provide motive force to the cart AGV 116 and a guidance system adapted to locate the cart AGV 116 in the distribution facility. In some implementations, the cart AGV 116 is adapted to autonomously transport a carton holder (e.g., a cart or shelves) that is, in turn, adapted to hold cartons. Cartons may include, for instance, a box (e.g., a shipping box) adapted to hold items. For example, a cart AGV 116 may push/pull a cart (e.g., a carton holder) holding cartons around a pick-to-cart area 302 and may automatically stop at storage bays of the pick-to-cart area 302 where items to be picked are stored, so that a picker in the pick-to-cart area 302 can easily place items into one or more of the cartons. In some instances, the cart AGV 116 may transport the cart to a pick-cell station 316 to receive additional items into the cartons from high-density storage (e.g., from modular storage units 602 in high-density storage, as described below). In some instances, the cart AGV 116 may move at walking speed next to, behind, or in front of a picker walking through the pick-to-cart area 302 of the distribution facility. Additional details of example cart AGVs 116 are shown in reference to FIGS. 5A and 5B.

An MSF AGV 114a . . . 114n is an automated guided vehicle or robot configured to autonomously transport items from a high-density storage area 304 of the distribution facility to a pick-cell station 316, replenishment area 318, and/or finalizing area 314. The MSF AGV 114 may include a drive unit adapted to provide motive force to the MSF AGV 114, a guidance system adapted to locate the MSF AGV 114 in the distribution facility, and a modular storage unit holder adapted to hold modular storage units 602. In some implementations, an MSF AGV 114 may autonomously retrieve modular storage unit(s) 602 containing items to be picked in an order. For instance, the MSF AGV 114 may transport the modular storage unit(s) 602 to a pick-cell station 316, so that a picker at the pick-cell station 316 can pick items from the modular storage unit(s) 602 and place them into cartons in a cart. For example, a cart AGV 116 may transport a carton to a bay in the pick-to-cart area 302 having a first item in an order, then to a pick-cell station 316 where a separate MSF AGV 114 has delivered or will deliver a second item (e.g., in a modular storage unit 602) in the order, so that a picker can place the second item into the carton with the first item. The system may coordinate the timing, placement, and movement of the cartons, modular storage units 602, pick-cell station 316 workload, and AGVs to bring cartons and modular storage units 602 having items corresponding to an order to the same pick-cell station 316 during the same time window, as described in further detail herein. Additional details of example MSF AGVs 114 are described in reference to FIGS. 7A-7I.

The WMS 104 may, in some embodiments, include one or more hardware and/or virtual servers or software routines storable in one or more non-transitory memory devices and executable by one or more processors to perform the operations, acts, and/or functionality described herein. The WMS 104 may be configured to store and maintain carton data 124 in the data store 120. The carton data 124 includes information about cartons in the system, such as a unique identifier for each carton, a carton type, the zones the carton will visit, the number of pick lines the carton proceed through, and the priority for the carton. Some cartons may have a higher priority relative to other cartons and the system may expedite handling of those cartons with higher priority relative to other cartons in the system. The carton data 124 may include a picklist defining the items the carton will contain. The WMS 104 may store data mapping items to the different pick zones (e.g., the pick-to-cart area 302, the high-density storage area 304, a particular modular storage unit 602, a particular location at a particular pick-cell station 316, etc.). In some implementations, the WMS 104 may be configured to communicate the carton data 124 with the WES 102, the picking system 108, and/or dispatch system 106 in real time, in batches, as requested by these components, etc.

The picking system 108 may, in some embodiments, include one or more hardware and/or virtual servers or software routines storable in one or more non-transitory memory devices and executable by one or more processors to perform the operations, acts, and/or functionality described herein. The picking system 108 may receive pick confirmations, for example, from pickers or operators (e.g., using barcode scanners, NFC, RFID chips, or other sensors or input methods) working within a pick zone (e.g., a pick-to-cart area 302, pick-cell station 316, etc.) confirming that picks for a given carton have been performed, as described in further detail below. An example picking system 108 may include an available pick-to-voice or a pick-to-light system. The picking system 108 may be configured to communicate the pick confirmation data with the WES 102, WMS 104, or other components of the system in real time, in batches, as requested by the components of the system, etc.

The picking system 108 may receive confirmatory input (e.g., pick confirmations) from pickers working within a pick zone. The confirmatory input confirms that all picks for a given carton have been completed. The picking system 108 transmits the confirmatory input to the WES 102. The confirmatory input may include the time stamp reflecting completion of the picks in the zone, a unique identifier identifying the picker (operator), a unique identifier identifying the pick zone, a unique identifier identifying the AGV, and/or a unique identifier identifying the carton (e.g. a carton number).

The data store 120 is an information source for storing and providing access to data. The data stored by the data store 120 may be organized and queried using various criteria including any type of data stored by it. The data store 120 may include data tables, databases, or other organized collections of data. An example of the types of data stored by the data store 120 may include, but is not limited to map data 122, AGV data 128, carton data 124, order data 126, modular storage unit data, etc. In some instances, the data store 120 may also include, conveying system attributes, picking data, picker attributes, sensor data, etc.

The data store 120 may be included in the WES 102, WMS 104, or in another computing system and/or storage system distinct from but coupled to or accessible by the WES 102, WMS 104, or other components of the system 100. The WES 102, picking system 108, and/or dispatch system 106, for example, may store and maintain map data 122, order data 126, carton data 124, and AGV data 128. The data store 120 can include one or more non-transitory computer-readable mediums for storing the data. In some implementations, the data store 120 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The map data 122 may include data reflecting the 2 or 3 dimensional layout of the facility including the location of modular storage units 602, picking areas, lanes, equipment 110, etc. Map data 122 may indicate the attributes of the distribution facility, including attributes of zones (e.g., one or more pick-to-cart areas 302, high-density storage areas 304, induction zones 308, finalizing areas 314, pick-cell stations 316, replenish stations, etc.). For example, attributes of zones may include the number, quantity, and location of shelving units or bays, modular storage units 602, items, guidance system locators, etc. In some implementations, the map data 122 may include the location of guidance system locators.

The order data 126 includes data about picking including orders, items picked, items to be picked, picking performance, picker identities, pick confirmations, locations items are picked from, etc. Order data 126 may indicate the quantity and identity of items in orders, shipping addresses, order priority, progress of order fulfillment, number of cartons in an order, etc.

Item data 130 may describe items available for picking in a distribution facility. The item data 130 may include unique identifiers for these items, the item volume (e.g., the total amount picked in given window (e.g., in an hour, day, etc.)), the item velocity (e.g., number of different times item picked in given window (e.g., per hour, day etc.), the unique location of the items within the distribution facility (isle, shelf, shelf position, etc.), other attributes of the item (e.g., size, description, weight, quantity of items in a package, color, etc.), item inventory, mapping of items of modular storage units 602, etc. In some implementations, the item data 130 may include the quantity of particular items a modular storage unit 602 contains, the current location of a modular storage unit 602, a preferred storage location of items and/or modular storage units 602, a threshold inventory level of items to be satisfied before autonomously transporting the modular storage unit 602 to a replenishment area 318 by an MSF AGV 114 (e.g., to restock the items in the modular storage unit 602).

The AGV data 128 may describe the state of an AGV (operational state, health, location, battery life, storage capacity, items being carried, cartons, etc.), whether picker assigned to it, etc.

The components of the system may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth, NFC, etc.), etc. In some embodiments, one or more of these components may be coupled via a data communications bus.

Figure 2:
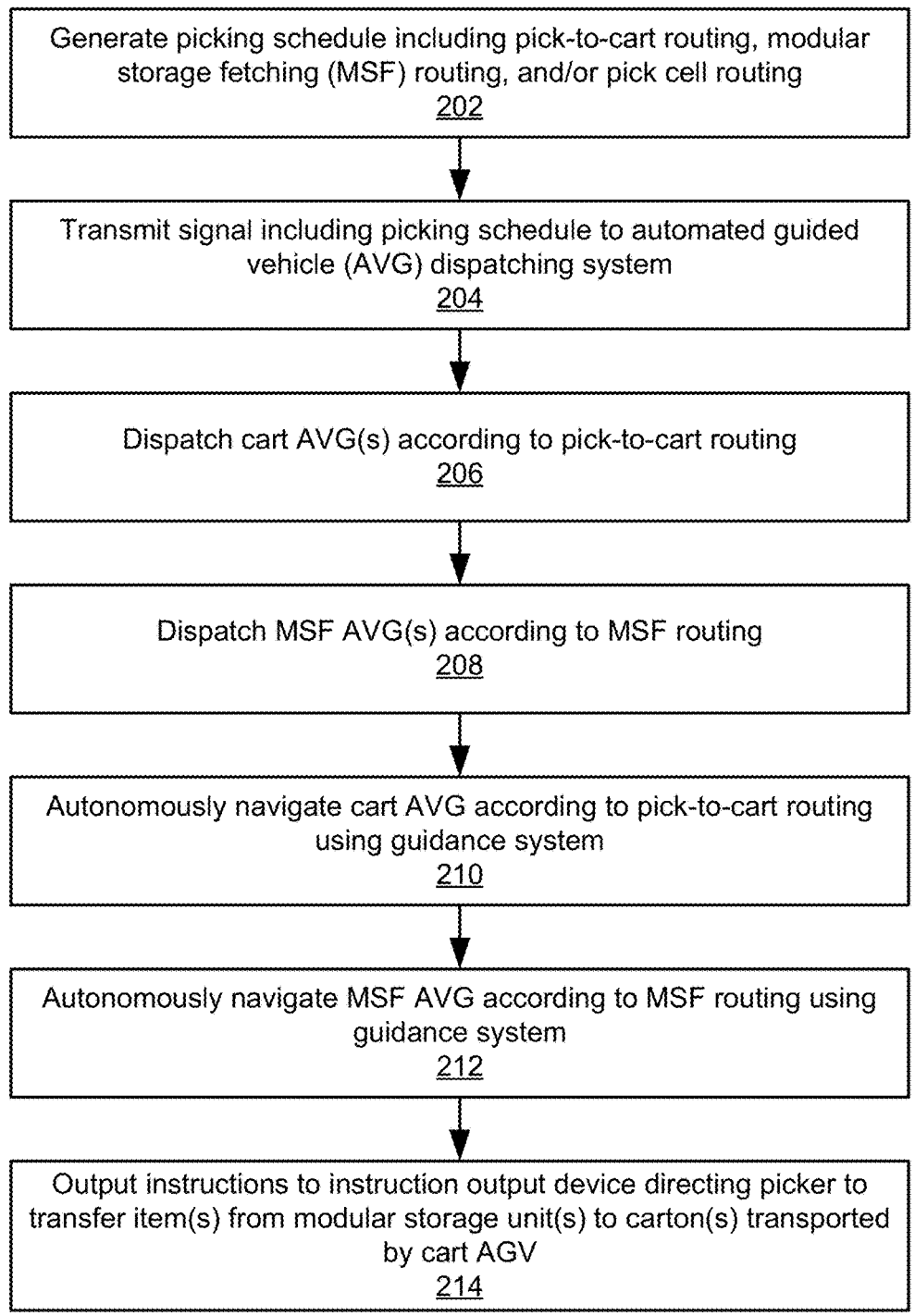
FIG. 2 is a flowchart of an example method for picking an order in a hybrid modular storage fetching system.

FIG. 2 is a flowchart of an example method for picking an order in a hybrid modular storage fetching system. At 202, the WES 102 may generate a picking schedule including pick-to-cart routing, modular storage fetching (MSF) routing, and/or pick-cell routing based on order data 126. The order data 126 may include one or more first unique identification codes representing one or more first items located in a pick-to-cart area 302 of a distribution facility. In some instances, the order data 126 may also include one or more second unique identification codes representing one or more second items located in a high-density storage area 304 of the fulfilment facility.

The pick-to-cart routing describes routing of a particular cart AGV 116a . . . 116n through a pick-to-cart area 302. For example, the pick-to-cart routing may include a picking list of pick-to-cart items to be picked to the cartons transported by the cart AGV 116. The pick-to-cart routing may indicate the location of the storage units, shelves, or bays in which an item in the picking list is located. In some implementations, the pick-to-cart routing may also include a defined route of a cart AGV 116 through these locations and an indication of locations at which to stop the cart AGV 116, so that a picker can pick items from adjacent storage units, shelves, or bays into the cartons transported by the cart AGV 116. The pick-to-cart routing may also include a schedule indicating when to pick items and when to deliver cartons to a particular pick-cell station 316.

The MSF routing describes routing of a particular MSF AGV 114 through a high-density storage area 304. For example, the MSF routing may include a picking list of items stored in modular storage units 602, unique identification codes of the modular storage units 602, and the current locations of the modular storage units 602. In some instances, the current location of the modular storage units 602 may be in the high-density storage area 304, in a replenishment area 318, or at a pick-cell station 316. The MSF routing may also include a defined route of an MSF AGV 114 through the distribution facility to retrieve one or more modular storage units 602 including items from one or more orders and deliver those modular storage units 602 to assigned pick-cell stations 316. The defined route may be calculated to most efficiently retrieve one or a series of modular storage units 602, maximize a quantity of modular storage units 602 for the MSF AGV 114 to retrieve in a single trip, to avoid traffic of other AGVs, and/or to cause the modular storage unit(s) 602 to arrive at a pick-cell station 316 at a minimized time difference from a carton (e.g., transported by a separate cart AGV 116) arriving at the same pick-cell station 316 to which the item in the modular storage unit 602 is to be placed, for example. The MSF routing may also include a schedule indicating when to retrieve modular storage units 602 and when to deliver the modular storage units 602 to a particular pick-cell station 316.

Pick-cell routing may describe routing of AGVs among pick-cell stations 316. For instance, a modular storage unit 602 may be transferred by an MSF AGV 114 from one pick-cell station 316 to another pick-cell station 316, as described elsewhere herein.

In some implementations, the WES 102 may determine, based on load information in one or more of the pick zones, that a particular zone, picker, path, pick-cell station 316, etc., has a high traffic load. In response to such a determination, the WES 102 may dynamically adjust the routing schedule, for example, dictating which cart AGVs 114 or MSF AGVs 116 are sent into different zones of the distribution facility. For example, the WES 102 may determine that there is a threshold level of traffic (e.g., by cart AGVs 114) in the pick-to-cart area 302, in response to which determination, the WES 102 may induct AGVs (e.g., cart AGVs 114 with particular orders to be filled) into the hybrid modular storage fetching system that bypass the pick-to-cart area 302 and proceed directly to pick-cell stations 316 to receive items from modular storage units 602. In another example implementation, the WES 102 may determine, for instance, that there is a threshold level of traffic in a staging area 312 or that no MSF AGVs 116 are available to retrieve items from high-density storage 304 and may, in response, induct cart AGVs into the system that do not stop at a pick-cell station 316 or that require fewer modular storage units 602 to be retrieved from high-density storage. Accordingly, in some implementations, the WES my dynamically balance the load of various zones, AGVs, pick-cell stations, etc., in the system by adapting the composition (e.g., items from pick-to-cart versus from high-density storage) of orders/cartons on a particular AGV (e.g., a cart AGV), for example.

At 204, the WES 102 or picking system 108 may transmit a signal including the picking schedule (or components thereof) to the dispatching system 106.

At 206, the dispatching system 106 may dispatch a cart AGV 116 according to the picking schedule. In some implementations, dispatching a cart AGV 116 may include creating cartons, assigning the cartons to a cart to be transported by a cart AGV 116, placing the cartons on the cart, and, in some instances, coupling the cart AGV 116 with the cart. For instance, the WES 102 may assign orders (or items thereof) to cartons. Labels with unique identification codes identifying the cartons may be printed, placed on cartons, and the cartons may be placed on the cart at an induction area 308. The unique identification codes of the cartons may match, in the data store 120, the carton (and therefor the cart/cart AGV 116) with items to be picked.

At 208, the dispatching system 106 may dispatch an MSF AGV 114 according to the MSF routing.

At 210, the cart AGV 116 may autonomously navigate along a path through the pick-to-cart area 302 according to the pick-to-cart routing to retrieve one or more items located in the pick-to-cart area 302. As described elsewhere herein, the cart AGV 116 may follow the guidance system through the pick-to-cart area 302 and stop at designated areas for items stored in those areas to be picked to the designated cartons. In some implementations, the cart, carton, cart AGV 116, storage area, or separate computing device (e.g., a mobile device of a picker) may include an output device provide output indicating items to be picked at a particular location and, in some implementations, the output device may also include an input to receive pick confirmations. Once the pick confirmation has been received, the cart AGV 116 may autonomously move to the next area to pick a subsequent item assigned to a carton on the cart.

Once items in the pick-to-cart storage area have been picked to the cart AGV 116, the cart AGV 116 may autonomously navigate to an assigned pick-cell station 316 or to a finalizing area 314 according to the pick-to-cart routing. In some implementations, the cart AGV 116 may decouple from the cart and leave the cart at the pick-cell station 316 (or at a finalizing area 314) so that the cart AGV 116 may transport another cart while the first cart is being filled with items from modular storage units 602, for example.

At 212, the MSF AGV 114 may autonomously navigate to a location of the one or more modular storage units 602 in the high-density storage area 304 (or a replenishment area 318, pick-cell station 316, etc.), the one or more modular storage units 602 containing one or more items in an order, for example, an order with a carton transported by a cart AGV 116, as described above. The MSF AGV 114 may autonomously retrieve the one or more modular storage units 602 from the high-density storage area 304, for example. The MSF AGV 114 may then autonomously navigate from the location of the modular storage unit(s) 602 to the pick-cell station 316 according to the MSF routing to transport the modular storage unit(s) 602 to the pick-cell station 316. In some implementations, the MSF AGV 114 may hold a plurality of modular storage units 602 and may deliver each of the modular storage units 602 to the same pick-cell station 316 or to separate pick-cell stations 316. In some implementations, the MSF AGV 114 may also retrieve modular storage units 602 that are no longer needed at a particular pick-cell station either separately or while delivering new modular storage units 602 to the pick-cell station.

At 214, the picking system 108 outputs instructions to an output device (e.g., on the cart, pick-cell station, modular storage unit 602, or separate computing device, etc.), the instructions directing a picker at a pick-cell station to transfer items from modular storage unit(s) 602 at the pick-cell station to carton(s) on the cart.

FIG. 3A depicts a schematic of an example configuration of a distribution facility. It should be understood that various distribution facilities may include different picking zones having different stocking infrastructure and picking configurations. For instance, high-volume and/or velocity items (e.g., items appearing frequently in orders) may be stored in a pick-to-cart area 302 and be available for immediate picking, and relatively moderate and/or low-volume and/or velocity items may be stored in higher-density storage area 304 on modular storage units 602 which may be retrieved by MSF AGVs 114 for an upcoming pick.

The layout depicted in FIG. 3A includes various areas: an induction area 308, a pick-to-cart area 302, a pick-cell area 310, a pick-cell staging area 312, a high-density storage area 304, a finalizing area 314, and an elevator for multi-level access (not shown). In some cases the layout may include multiple levels of mezzanine with one or more of the different zones/areas. In some implementation, cart AGVs 116 are staged in the induction area 308 and are set up for picking sessions. In some embodiments, cartons are assembled, labeled with unique scannable visual identifiers to associate them with specific orders, and are placed on the supports (e.g., cart shelves) of the cart AGVs 116 in the induction area 308.

The pick-to-cart area 302 is configured for high-velocity and/or volume items and advantageously reduces capital associated to handle this type of item class. Inventory may be stored in high-volume storage in cartons or pallets, for example. High velocity items may be divided into pick zones, each zone may include a plurality of bays (e.g., 4, 5, 6+), which may be balanced by the SKU routing engine based on demand by the SKU routing engine. Cart AGVs 116 may be scheduled by the AGV management engine to autonomously visit these zones, and pickers accompanying the cart AGVs 116 may be guided by the picking hardware (e.g., pick-to-voice and/or pick-to-light) controlled by the picking system 108. In an example, a cart AGV 116 is instructed by the AGV management system to stop directly in front of a bay location. The cart AGV 116 may self-locate using a guidance system. For example, the guidance system may include guidance system locators, such as guide tape (magnetic, colored, etc.), laser target navigation, inertial navigation, vision guidance, geolocation, QR codes on the floor of the distribution facility, RFID (radio frequency identification) tags, beacons, etc., that can be used to locate and navigate AGVs in the distribution facility. Further, the AGVs may include guidance system components configured to read the guidance system locators, such as a QR code reader, wireless radio, etc.

After the picker picks the item and confirms the pick with the picking hardware, the cart AGV 116 autonomously moves to the next sequential bay until the picks are complete. As shown in FIG. 3A, a cart AGV 116 has the capability to bypass zones, bays, shelves, etc., without picks. Each zone can have dedicated cart AGV 116 accumulation before the zone to reduce cycle time.

The picking station area may include pick-cell stations 316*a*, 316*b*, and 316*c* situated along primary path(s) via which the cart AGVs 116 are routed. In FIG. 3A, the pick-cell stations 316 are situated opposing a portion of the pick-to-cart area 302 and the cart AGVs 116 may be routed to visit one or more of these pick-cell stations 316 depending on the items that need to be picked and placed in the cartons of these cart AGVs 116. In the case that in given cart AGV 116 does not require any items from the picking station area, it may bypass it entirely and proceed to the finalizing area 314.

In some embodiments, for a given picking session, the AGV management engine may establish a single line picking configuration in which the picker and the cart travel through an inventory pick path along a single line until the picks are fulfilled. In further embodiments, based on demand, a fast moving area may be established by the AGV management engine that includes multiple routes: a higher speed line that includes single line picking for low-demand items and another area for high demand items. This combination can advantageously balance daily labor.

The layout may also include a replenishment area 318 in which modular storage units 602 are replenished with items. For instance, item inventory in a given modular storage unit 602 may be replenished by a MSF AGV 114 that picks the modular storage unit 602 from static shelves and transports them to the replenishment area 318 where a case may be opened and items from the case placed directly into the modular storage units 602. One or more different items can be placed in a given modular storage unit 602. In some cases the modular storage unit 602 may be replenished while the container is in the static shelf. Having multiple options (manual or AGV) for replenishment has more flexibility to adjust to resource allocation and schedule. Additionally or alternatively, the MSF AGV 114 can swap out the modular storage unit 602 with another containing the same SKUs which has been prepared ahead of time and staged for that purpose.

In some implementations, the AGV management engine may instruct MSF AGVs 114 to replenish and distribute modular storage units 602 in different locations of the high-density storage area 304 based on order history. In these implementations, items with high order frequency orders may be distributed in more locations than items with lower order frequency. The WES 102 may maintain a moving minimum based on order quantity minimizing the need to use inventory from two locations to fulfill an order, and the AGV management engine may schedule the AGVs accordingly.

The modular storage units 602 storing items may be moved by MSF AGVs 114 from high-density storage area 304 into a staging area 312 and staged for movement into a pick-cell station for an upcoming pick. In some embodiments, the storage units of faster-moving items may be moved directed to a pick cell 382 in a given pick-cell station 316.

In further embodiments, the AGV management engine may instruct a MSF AGV 114 to transfer a modular storage unit 602 between cells of a pick-cell station 316, or between pick-cell stations 316 (e.g., 316*a* and 316*b*) without having to expend the time to return the modular storage unit 602 to the high-density storage area 304.

FIG. 3A also illustrates example paths of AGVs through the distribution facility. The paths are represented by dotted lines, cart AGVs 116 are represented by ovals, and MSF AGVs 114*a* . . . 114*d* are represented by diamonds.

Example cart AGV paths are illustrated in FIG. 3A, for example, a cart AGV 116 may navigate from an induction area 308, on a path through the pick-to-cart area 302, and then to one or more pick-cell stations 316. Once the picks for the cart AGV 116 have been completed, it may navigate to a finalizing area 314 where cartons are prepared for shipment, for example. Once the cartons have been removed from the cart AGV 116, the cart AGV 116 may return to the induction area 308 to start through the process again.

Example MSF AGV paths are also illustrated in FIG. 3A, for example, an MSF AGV 114*a* may transport a modular storage unit E from a first pick-cell station 316*a* to a replenishment area 318 for replenishment. An MSF AGV 114*b* may retrieve a first modular storage unit A from a first location, navigate to a second location, retrieve a second modular storage unit B, and transport both the first and second modular storage units A and B to a pick-cell station 316*b*. An MSF AGV 114*c* may retrieve a modular storage unit C from a first pick-cell station 316*a* and transport it to a second pick-cell station 316*b*. An MSF AGV 114*d* may retrieve a modular storage unit D and transport it back to the high-density storage area 304. It should be understood that these paths and implementations are provided as examples and that other combinations are possible and contemplated herein. For example, one or more MSF AGVs 114 may perform some or all of the paths illustrated as well as others not illustrated in FIG. 3A. Further, as described elsewhere herein, the automation of the MSF AGV 114 may be performed in synchronization with other actions (e.g., automation of cart AGVs 116, picking sessions or windows, movement of other AGVs or pickers, etc.) in the hybrid modular storage fetching system.

Figure 3B:
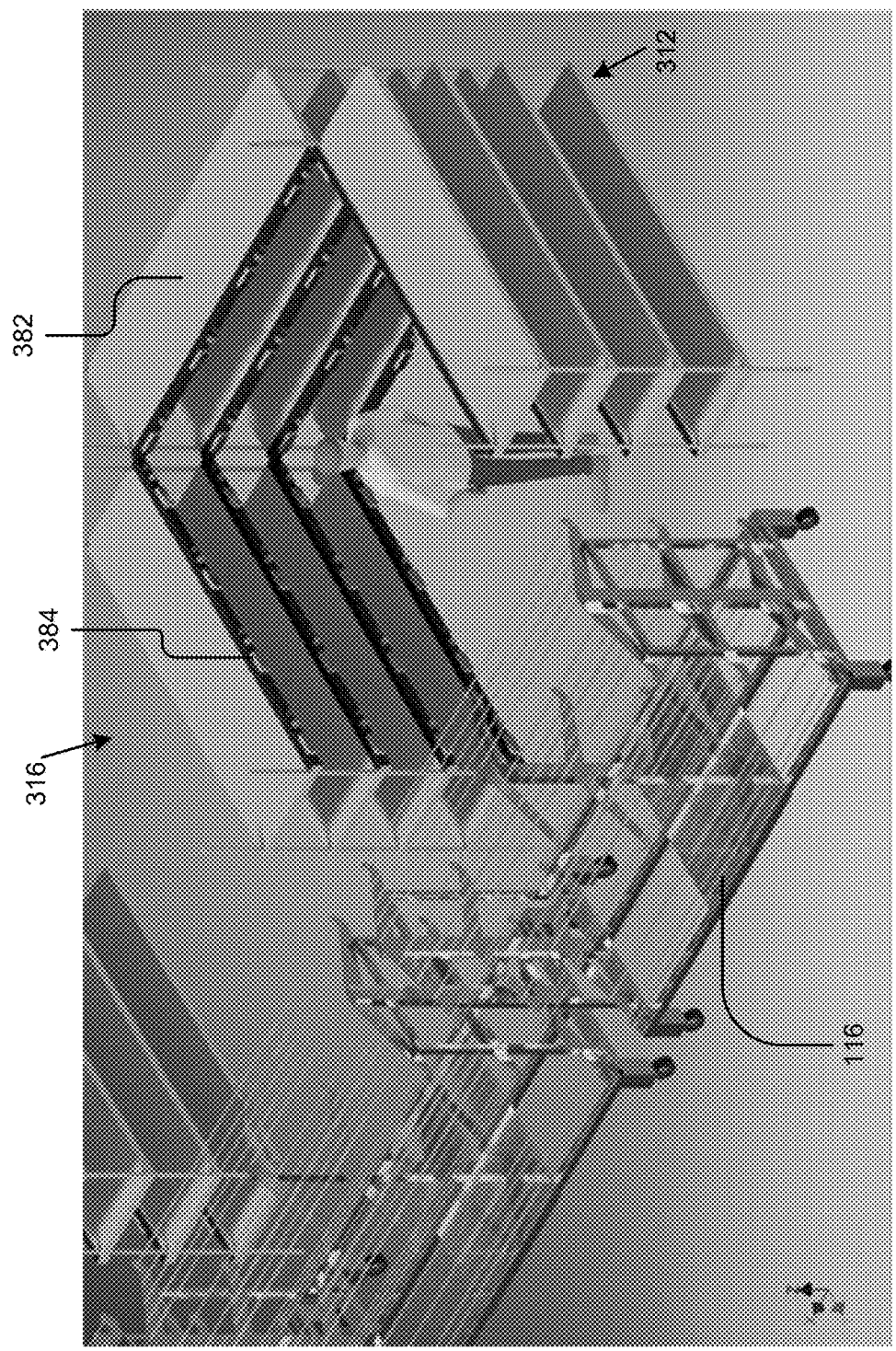
FIG. 3B is an illustration of an example pick-cell station.

FIG. 3B is an illustration of an example pick-cell station 316. Each pick-cell station 316 may include one or more pick cells 384. The pick cells 382 are a temporary storage mediums (e.g., shelves, bays, etc.) for the modular storage units 602 (e.g., mini pallets, totes, modular storage racks, etc.) and modular storage units 602 are storage containers that can be picked up or tugged and transported by a MSF AGV 114. In some cases the pick-cell station 316 may include an output device, such as a pick-to-light frame, for carts, that matches the locations of the cartons in the cart and/or a pick-to-light frame 384 for the pick cells 382 to indicate the locations of modular storage units 602 to use for a particular pick. For instance, a pick-cell station 316 may include an output device configured to provide picking instructions to a picker, the picking instructions indicating to the picker which of the items in the modular storage units 602 to place in a carton held on the carton holder of the cart AGV 116.

One or multiple of the pick cells 382 may be organized into a staging area 312 around a picker in a pick-cell station 316, so that modular storage units 602 can be easily accessed by the picker. In some implementations, an MSF AGV 114 may be configured to stage the modular storage units 602 at the staging area 312. For instance, an MSF AGV 114 may approach from the rear of a pick cell 382 and stage (e.g., place, deliver, etc.) a modular storage unit 602 on the pick cell 382. In some implementations, a modular storage unit 602 may be associated by the picking system 108 with a particular location in the staging area 312 to more precisely direct a picker to the location of the modular storage unit 602 (e.g., using a pick-to-light or other output system).

In some implementations, a pick cell 382 may be a device that is mobile and can be transported by an AGV. A mobile pick cell 382 can be preconfigured with modular storage units 602 prior to picking and then transported to the station.

At a given pick-cell station 316, a cart AGV 116 may arrive and situate itself on one side of the station with the cartons facing the picker. On the other sides of the station are pick cells 382 in which modular storage units 602 situated and from which the picker may select items to fulfill the orders associated with the cartons. The modular storage units 602 may contain one or more items, types of items, etc.

Figure 4A:
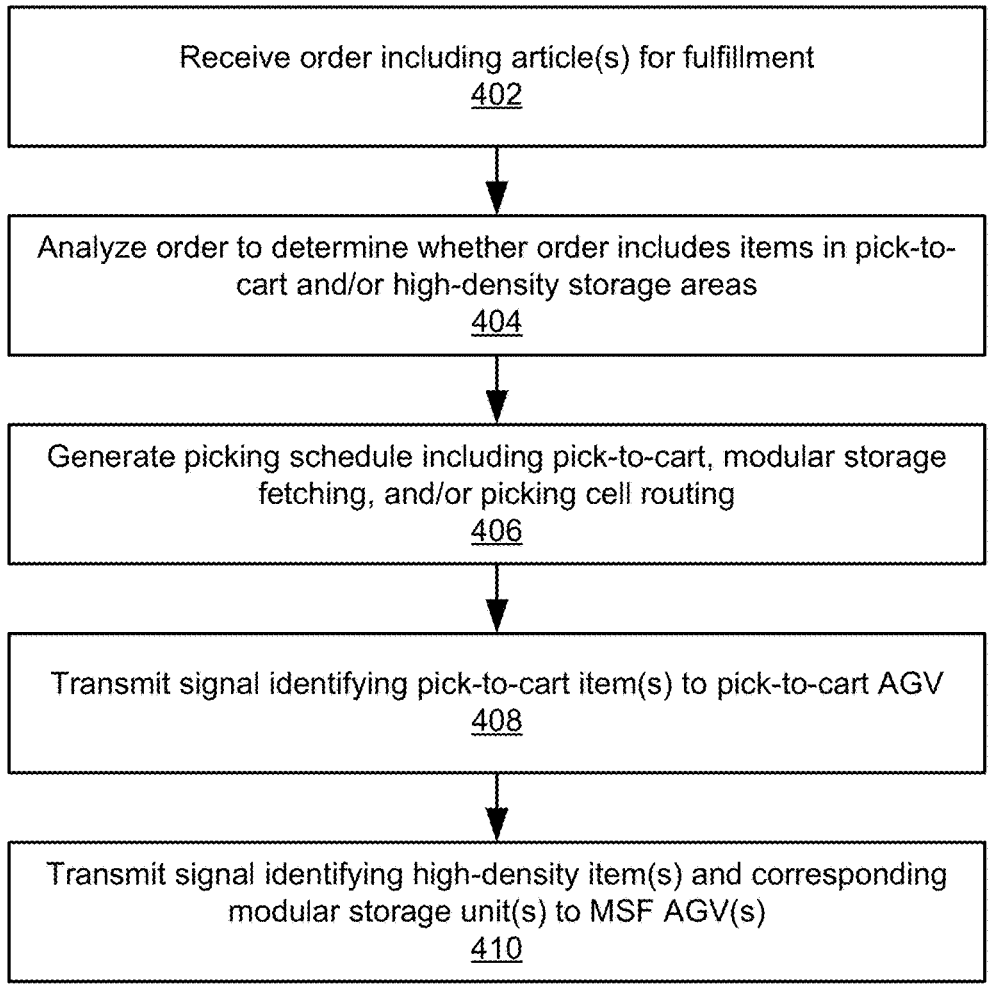
FIG. 4A is a flowchart of an example method for receiving and routing order data.

FIGS. 4A-4D are example methods for fulfilling an order in a hybrid modular storage fetching system. FIG. 4A is a flowchart of an example method for receiving and routing order data 126. At 402, the WES 102 may receive an order including items for distribution/fulfillment. The order may be reflected in order data 126 having a unique identification code (e.g., unique product codes, stock keeping units, etc.) for an item and a quantity associated with that item. The order may be assigned a carton (e.g., of a particular size, dimension, etc.) for picking and/or shipping or, in some instances, split into multiple cartons.

At 404, the WES 102 may analyze the order to determine whether the order includes items in pick-to-cart 302 and/or high-density storage areas 304. For example, a unique identification code of the items in the order may be matched against information in the data store 120 to evaluate the location (e.g., the particular zone, bay, shelf, modular storage unit 602, etc.) and quantity of the item in the inventory of the distribution facility.

At 406, the WES 102 may generate a picking schedule including pick-to-cart, MSF, and/or pick-cell routing, as described above. The generated picking schedule may indicate timing, a particular cart AGV 116 to retrieve pick-to-cart items, a particular MSF AGV 114 to retrieve items in high-density storage, and a particular pick-cell station 316 in which the items from each zone may be combined in a carton. In some implementations, the picking schedule may also indicate an induction station, finalizing area 314, particular path through the distribution facility, particular pickers or operators assigned to the orders, etc.

At 408, the dispatching system 106 may transmit a signal identifying pick-to-cart items, item locations, and, in some implementations, identification of a designated pick-cell station 316 and time window for the items to be at the designated pick-cell station 316, to a cart AGV 116. It should be noted that other information, such as routing directions, priority, traffic of other AGVs, etc., may also be provided to the cart AGV 116 and/or a computing device of picker(s) associated with the cart AGV 116 to refine the routing and autonomous navigation of the cart AGV 116.

At 410, the dispatching system 106 may transmit a signal identifying high-density items, corresponding modular storage units 602, locations of the corresponding modular storage units 602, etc., to one or more MSF AGVs 114 (e.g., multiple MSF AGVs 114 may be employed to distribute the work of modular storage unit 602 transport). Other information such as identification of a designated pick-cell station 316 and time window for the items to be at the designated pick-cell station 316, routing directions, priority, traffic of other AGVs, modular storage unit 602 dimensions, etc., may also be transmitted in the signal to the MSF AGV(s) 114.

Figure 4B:
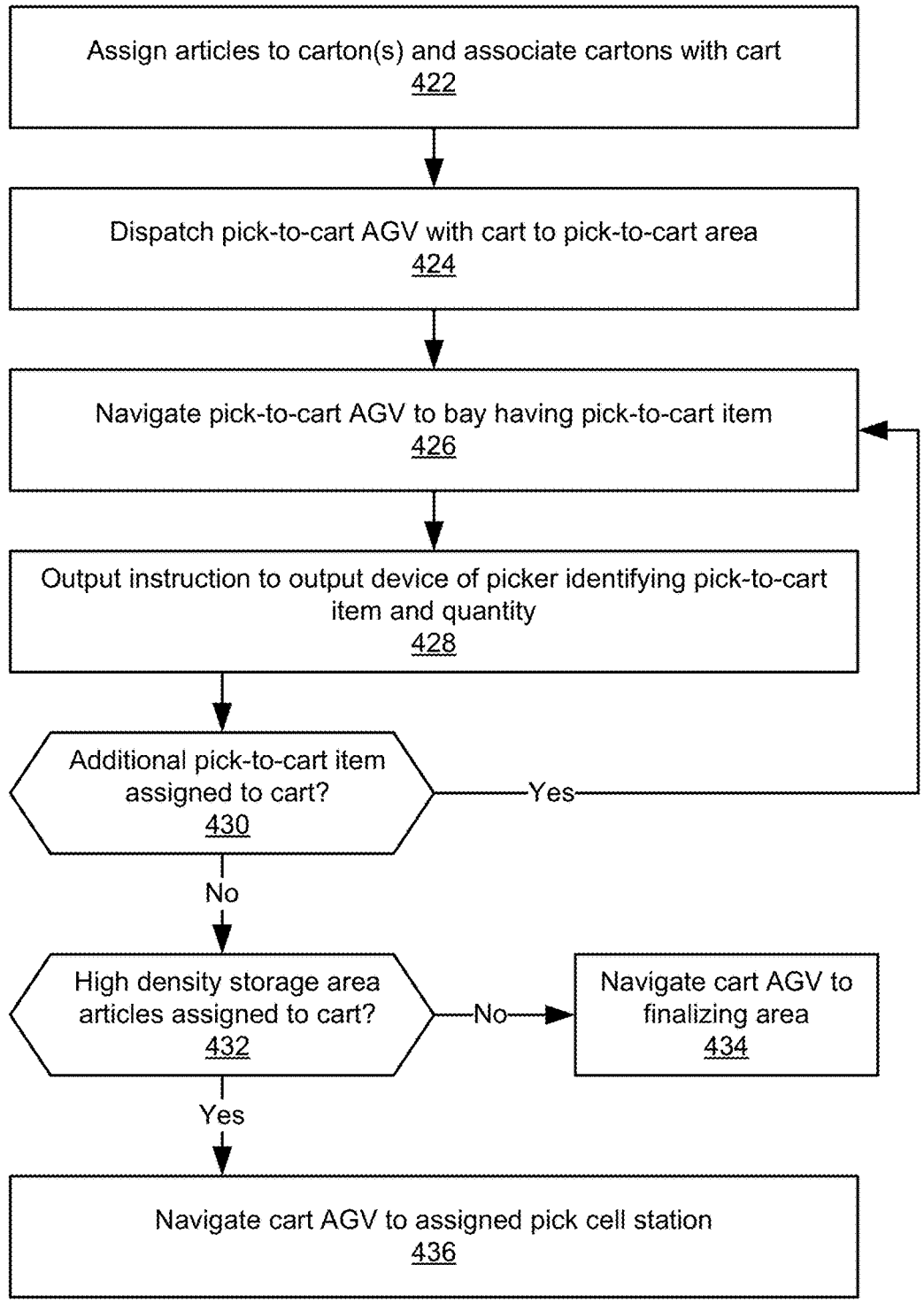
FIG. 4B is a flowchart of an example method for picking pick-to-cart items using a cart automated guided vehicle.

FIG. 4B is a flowchart of an example method for picking pick-to-cart items using a cart AGV 116. At 422, the WES 102 may assign items to carton(s) and associate the cartons with a cart in the database, and at 424, the dispatch system 106 may dispatch a cart AGV 116 with the cart to a pick-to-cart area 302, for example, as described above.

At 426, the cart AGV 116 may navigate to a bay (e.g., a shelving bay) where a pick-to-cart item is stored. The cart AGV 116 may stop adjacent (e.g., in front of) to the location where the item is stored.

At 428, the picking system 108 may output an instruction to an output device of a picker identifying the item and quantity to be picked at that location. In some implementations, the picking system 108 may coordinate lights or screens on the cart indicating into which carton an item is to be placed and/or lights on a shelving bay/location of the item in the pick-to-cart area 302 indicating the storage location of the item. Other systems, such as audio (e.g., pick-to-voice), a mobile computing device indicating the location of the item, etc., are possible.

At 430, the picking system 108 and/or cart AGV 116 may determine whether there are additional items in the pick-to-cart area 302 assigned to the cart and, in response to determining that there is an additional item, may return to 426 to navigate to the next location of an item. In some implementations, the order of locations visited by the cart AGV 116 is based on a picking list configured to order the picking according to a designated path through the pick-to-cart area 302. In some implementations, the output, at 428, may indicate that an item at a given location is to be picked into multiple cartons (e.g., which cartons may correspond to separate orders) on the cart.

At 432, in response to a negative determination at 403, the picking system 108 may determine whether there are items in the high-density storage area 304 also assigned to one or more cartons transported by the cart AGV 116 (and/or whether the cart is scheduled to be delivered to a pick-cell station 316). If there are no items to be added to the cartons from the high-density storage area 304 (or if, for example, these items are to be added at the finalizing area 314), the cart AGV 116 may autonomously navigate to a finalizing area 314. If, however, there are additional items to be added to one or more of the cartons transported by the cart AGV 116 at a pick-cell station 316, the cart AGV 116 may autonomously navigate to an assigned pick-cell station 316 to receive those items. This may be done according to (e.g., at a time window set by) a picking schedule, in coordination with an availability at the pick-cell station 316, and/or in coordination with one or more MSF AGVs 114 delivering items to the assigned pick-cell station 316 to be picked into cartons on the cart AGV 116.

Figure 4C:
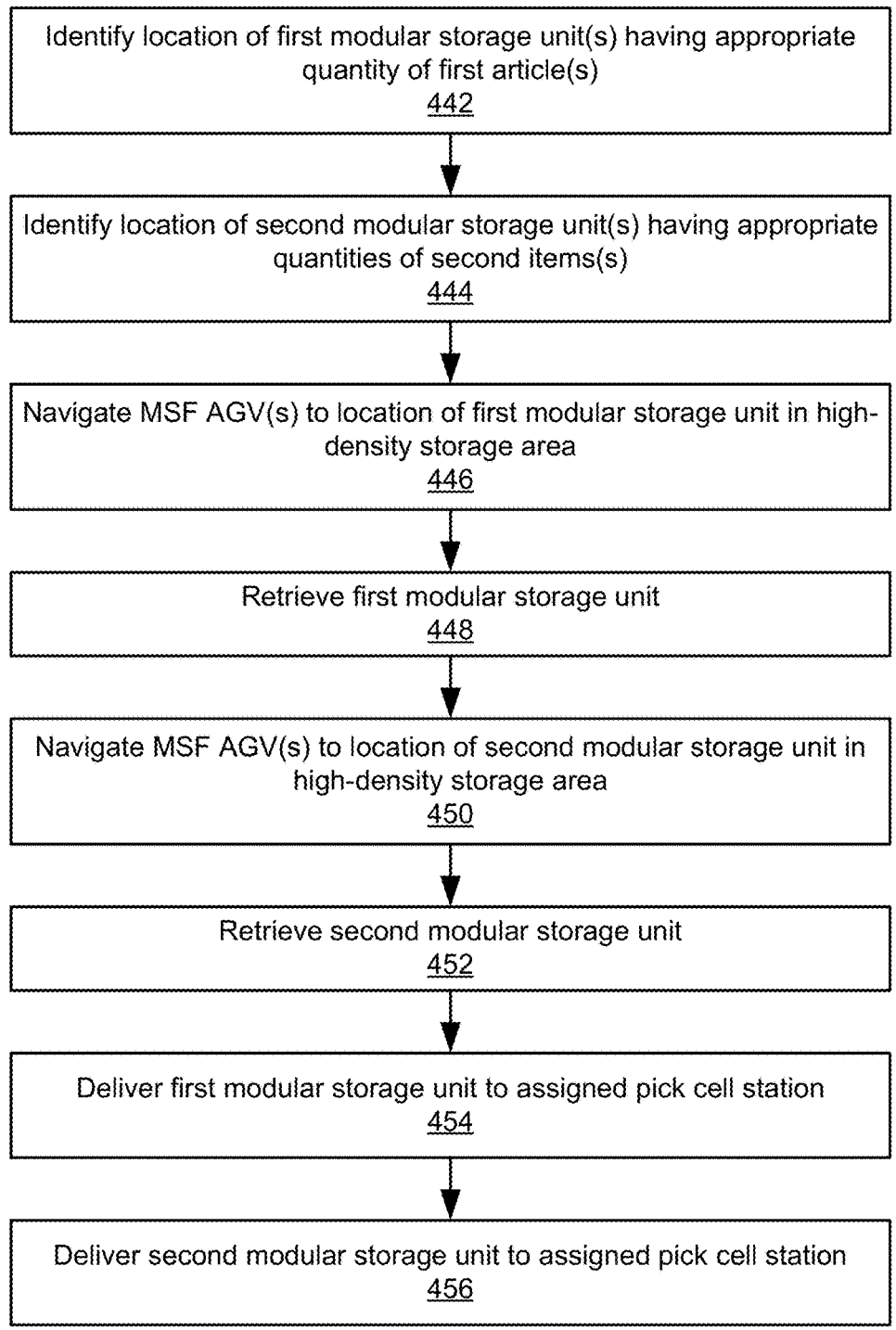
FIG. 4C is a flowchart of an example method for retrieving items in modular storage units from a high-density storage area using a modular storage fetching automated guided vehicle.

FIG. 4C is a flowchart of an example method for retrieving items in modular storage units 602 from a high-density storage area 304 using an MSF AGV 114. The method depicted in FIG. 4C may be executed in coordination with the method depicted in 4B, for example, as described elsewhere herein.

At 442, the WES 102 may identify a location of a first modular storage unit 602 having an appropriate quantity of first items in response to receiving a signal to retrieve those items from high-density storage (or another current location of a modular storage unit 602, such as a pick-cell station 316, replenishment area 318, etc.). As described above, the quantity of particular items stored in a modular storage unit 602 and the current location (and, in some instances, schedule of future locations) of the modular storage unit 602 are stored in the data store 120. In some implementations, a particular carton, order, or plurality of orders assigned to a cart may require multiple of a particular item. The WES 102 may verify that a sufficient quantity of the item is located in a particular modular storage unit 602 prior to signaling an MSF AGV 114 to retrieve the particular modular storage unit 602. If a particular modular storage unit 602 does not have a sufficient quantity of an item to fill all designated cartons, the MSF AGV 114 may retrieve a different modular storage unit 602 (e.g., having a sufficient quantity of the item), multiple modular storage units 602, or may send an error for a replenishment system/area, a human operator, or other system to remedy the error.

At 444, the WES 102 may identify a location of second modular storage unit(s) 602 having appropriate quantities of second item(s). A set of cartons transported by a cart AGV 116 may include any number of different items to be retrieved from high-density storage by an MSF AGV 114.

At 446, the MSF AGV(s) 114 (e.g., multiple MSF AGVs 114 may be used) may autonomously navigate to a location of a first modular storage unit 602 in a high density storage area, and at 448, the MSF AGV 114 may retrieve the first modular storage unit 602 (e.g., as described in reference to FIGS. 7A-7I).

At 450, an MSF AGV 114 may then autonomously navigate to a location of a second modular storage unit 602 in the high-density storage area 304 and retrieve a second modular storage unit 602. The path of an MSF AGV 114 may be determined to efficiently retrieve each modular storage unit 602. Additionally, the particular modular storage unit 602 (e.g., when multiple modular storage units 602 have a certain item) may be selected based on the most efficient location for the MSF AGV 114 to retrieve and/or proximity to an assigned pick-cell station 316.

At 454, the MSF AGV 114 may autonomously deliver the first modular storage unit 602 to a pick-cell station assigned for the first modular storage unit 602 and, at 456, the MSF AGV 114 may autonomously deliver the second modular storage unit 602 to a pick-cell station 316 assigned for the second modular storage unit 602. In some implementations, the pick-cell station 316 for the first and second modular storage units 602 may be the same pick-cell station 316. In some implementations, the pick-cell stations 316 for the different storage units may be different. For example, an MSF AGV 114 may deliver a first modular storage unit 602 to a first pick-cell station 316 and then autonomously navigate to a second pick-cell station 316 to deliver the second modular storage unit 602.

Figure 4D:
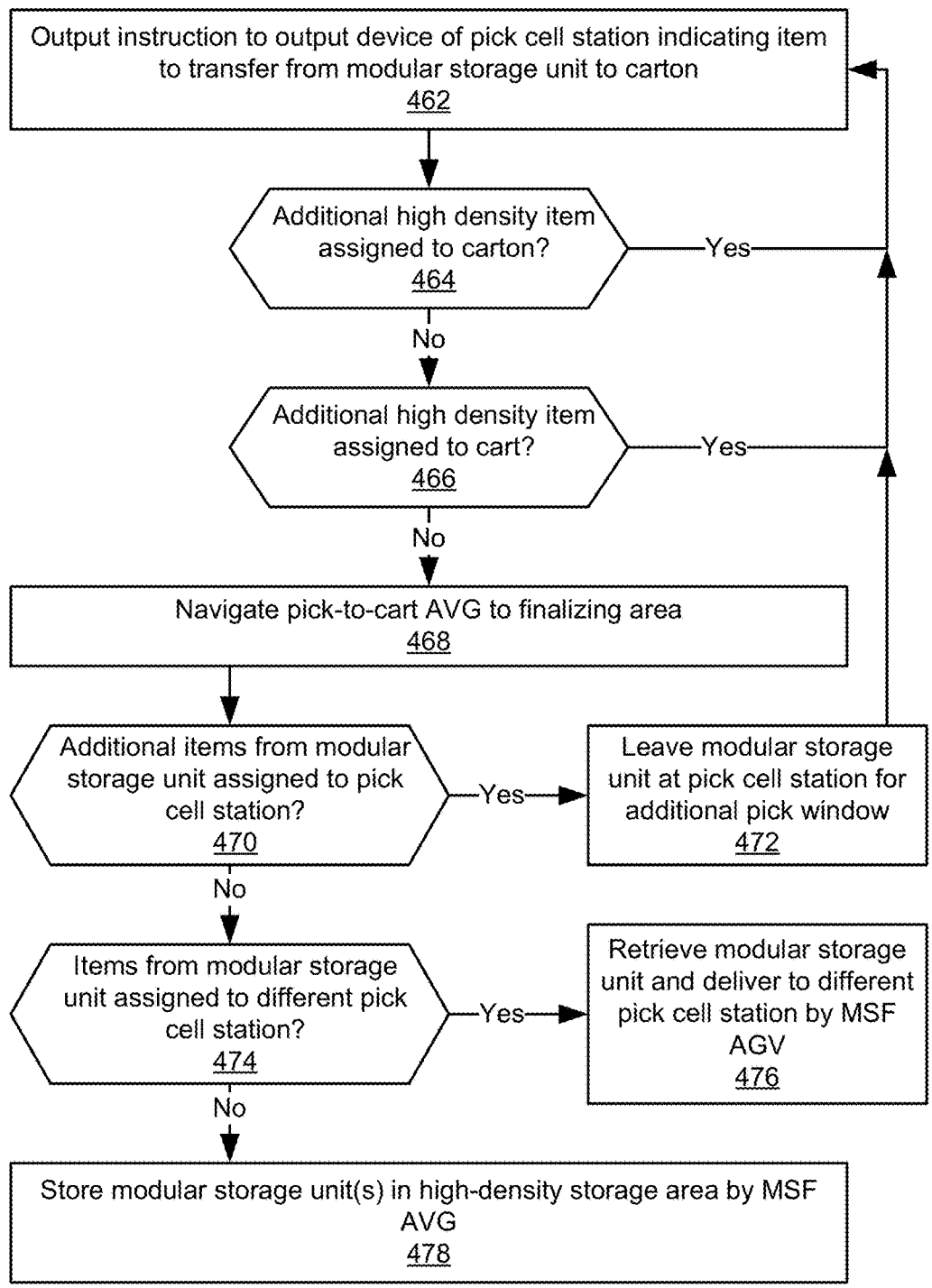
FIG. 4D is a flowchart of an example method for combining items from different zones of the distribution facility at a pick-cell station.

FIG. 4D is a flowchart of an example method for combining items from different zones of the distribution facility at a pick-cell station 316. Once the cart AGV 116 has transported the cartons to the pick-cell station 316 and the MSF AGV(s) 114 have transported the modular storage units 602 to the pick-cell station 316, the picking system 108 (or another component) may output, at 462, instructions to an output device of a pick-cell station 316 indicating an item to transfer from a modular storage unit 602 to a particular carton. In some implementations, the output device or another computing device may also receive confirmatory input indicating that the item has been placed in a designated carton.

At 464, the picking system 108 determines whether there are additional items from the modular storage units 602 at the pick-cell station 316 assigned to a particular carton. If there are addition items to be picked for a carton, the method may return to 462 for the next item assigned to a carton. If there are no more items to be picked for a particular carton, the picking system 108 may determine, at 466, whether there are additional items from modular storage units 602 assigned to the set of cartons in the cart (e.g., brought by the cart AGV 116 to the particular pick-cell station 316). If there are additional items for additional cartons, the method returns to 462 for those cartons and items and iterates accordingly. It should be noted that the order of the picking, output, confirmation, etc. process, may be changed without departing from the scope of this disclosure.

If the picks for a set of cartons on a cart are complete, at 468, the cart AGV 116 may autonomously navigate to a finalizing area 314, for instance, to ship the cartons.

The picking system 108, WES 102, or another component of the system 100 may move one or more of the modular storage units 602 from the pick-cell station 316. For example, at 470, a picking system 108 may determine whether additional items from a particular modular storage unit 602 are assigned to the pick-cell station 316 in a subsequent picking window (e.g., for a subsequent cart AGV 116 arriving at the pick-cell station 316). If the modular storage unit 602 (e.g., items remaining in the modular storage unit 602) will be used again at the pick-cell station 316, the modular storage unit 602 may be left, at 472, at the pick-cell station 316 for an additional pick window.

At 474, the WES 102 or picking system 108 may determine whether items from a particular modular storage unit 602 are assigned to a different pick-cell station 316 in a subsequent pick window and, if so, at 476, may direct the MSF AGV 114 to retrieve the modular storage unit 602 from the current pick-cell station 316 and deliver it to the different pick-cell station 316.

At 478, the MSF AGV 114 may retrieve one or more modular storage unit(s) 602 from the pick-cell station 316, autonomously navigate to a location in the high-density storage area 304, and store the modular storage unit 602 at that location. The locations at which the modular storage units 602 are stored may be determined based on availability, proximity to a pick-cell area 310, proximity to frequently co-ordered items, frequency with which the items in the modular storage units 602 are retrieved, or any other schema.

In some implementations, if all of a particular item in a modular storage unit 602 have been picked from the modular storage unit 602 (e.g., it is empty), then the MSF AGV 114 may autonomously deliver the modular storage unit 602 to a replenishment area 318.

Figure 5B:
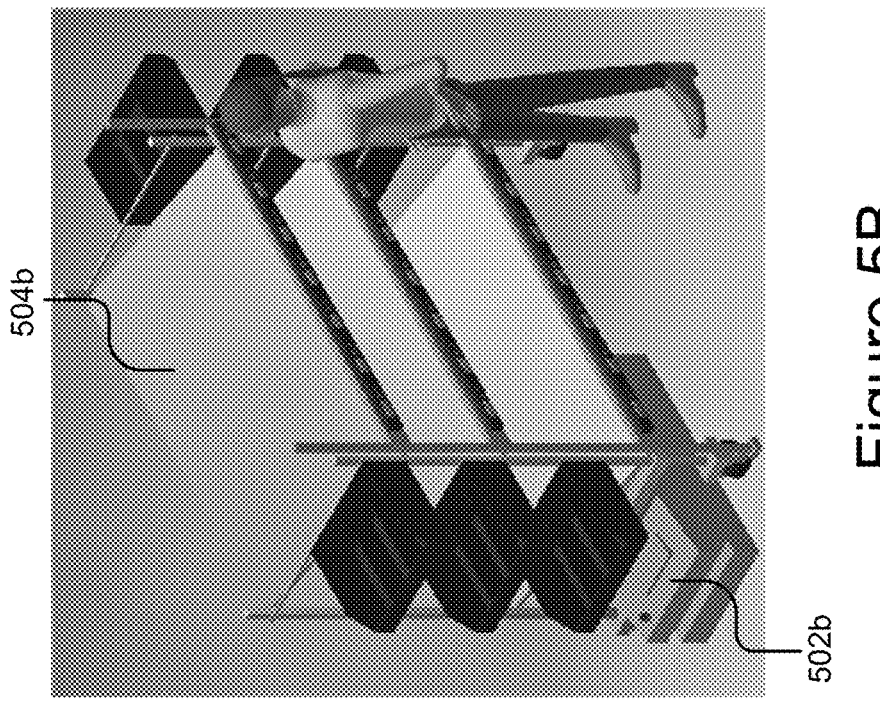
FIGS. 5A and 5B are illustrations of an example cart automated guided vehicles.
Figure 5A:
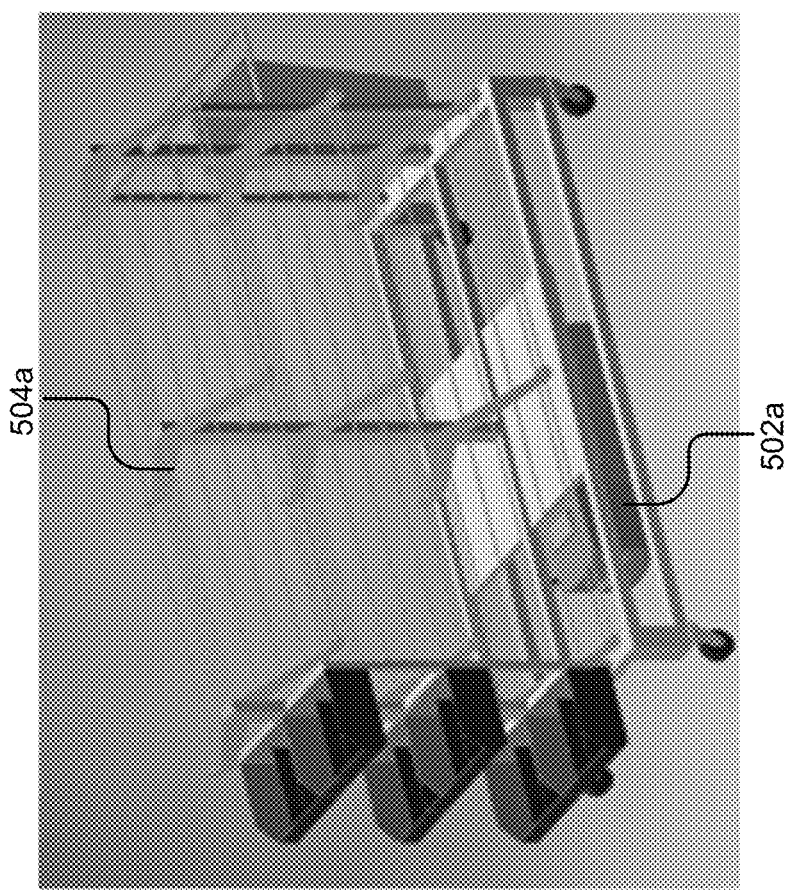

FIGS. 5A and 5B are illustrations of example cart AGVs 502a and 502b (e.g., also referred to as 116). The example cart AGVs may include an automated guided vehicle 502 or robot configured to autonomously transport pick-to-cart items, as described above. The cart AGV 502 may include or be adapted to autonomously transport a carton holder 504a or 504b (e.g., a cart or shelves) that is adapted to hold cartons (not shown in FIGS. 5A or 5B). For example, a cart AGV 502 may push/pull a cart (e.g., a carton holder 504). In some implementations, a carton may be a box placed on a shelf of the carton holder 504.

Figure 6B:
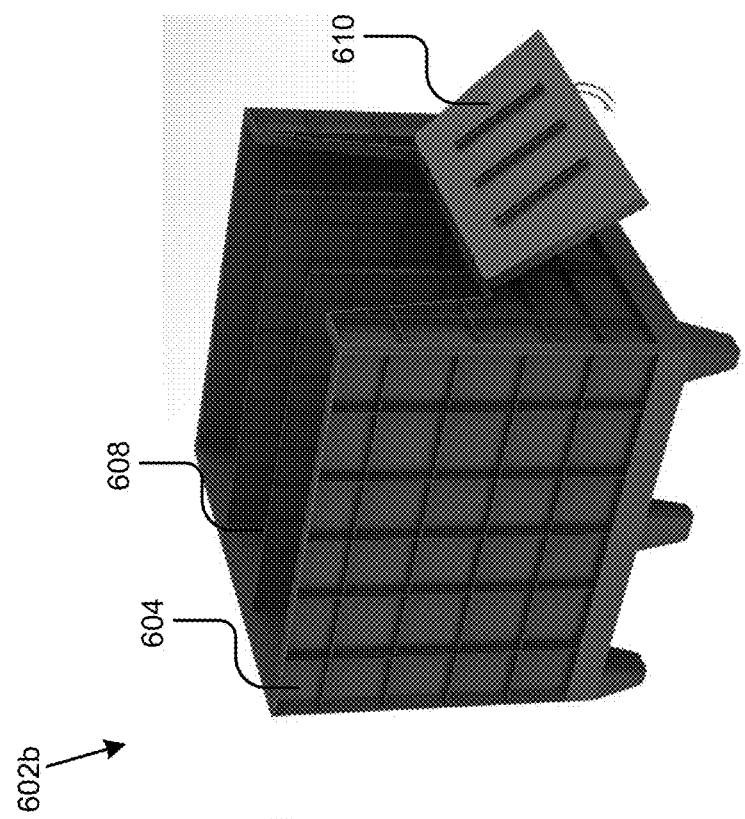
FIGS. 6A-6B are illustrations of example modular storage units.
Figure 6A:
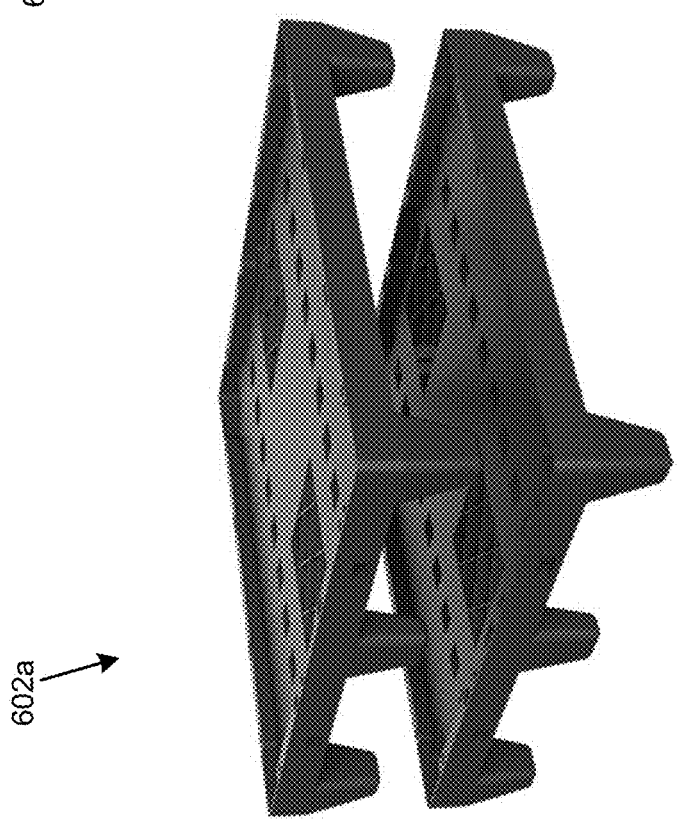

FIGS. 6A-6B are illustrations of example modular storage units 602a and 602b. In some embodiments, the modular storage units 602 are containers or sets of containers that may be moved between storage shelves, pick cells 382, etc. Modular storage units 602 may have various heights and widths (e.g., 2 to 24 inches high, and 1, 2, or 4 feet wide) and depths equal to the depths of shelving units (e.g., 18 to 24 inches). For example, the modular storage units 602 may be sized and configured to hold items commonly stocked in a fulfillment or distribution facility while also fitting onto standard shelves. A modular storage unit 602 may include a holding structure (e.g., a pallet as in 6A or a container as in 6B) adapted to hold items. The holding structure may be adapted to interface with a retrieval mechanism (e.g., a fork) of an MSF AGV 114.

As illustrated in FIG. 6A, a modular storage unit 602a may comprise a pallet or tote, which may be a holding container to support items designed to be picked up by an MSF AGV 114 using its retrieval mechanism. For example, a modular storage unit 602a may include a pallet and a holding structure that supports items designed to be picked up by an AGV with forks. In some implementations, a pallet may be stackable. In some implementations, a pallet may be attachable to a container to form a modular storage unit 602 such as the example depicted in FIG. 6B.

FIG. 6B illustrates another example modular storage unit 602b. As illustrated, a modular storage unit may include sides 604 and one or more divisions 608 dividing the modular storage unit 602b into multiple compartments. Further, in some implementations, a modular storage unit 602b may include a door 610, which may be opened and closed by a picker to provide easy access to items stored in the compartments. In some implementations, an MSF AGV 114 may automatically position the door 610 toward the center of a pick-cell station 316 to allow access by a picker.

Figure 7B:
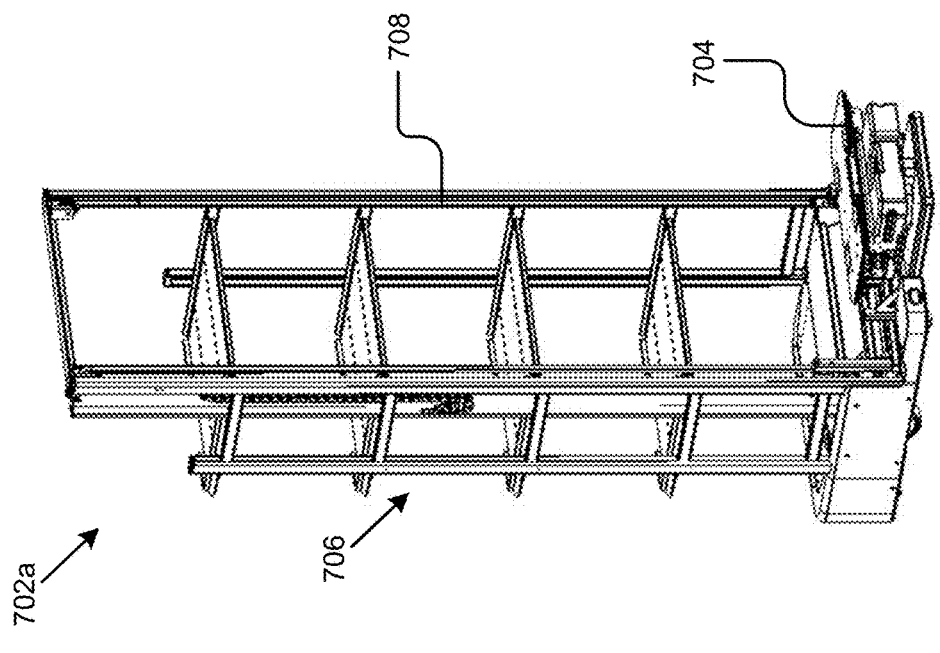
FIGS. 7A-7I are illustrations of example modular storage fetching automated guided vehicles.
Figure 7A:
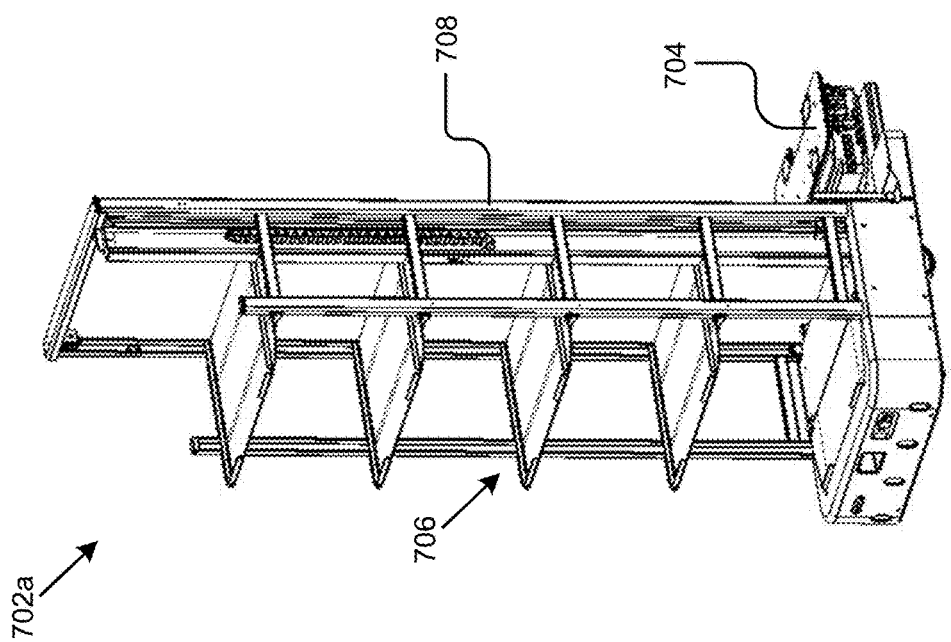
Figure 7C:
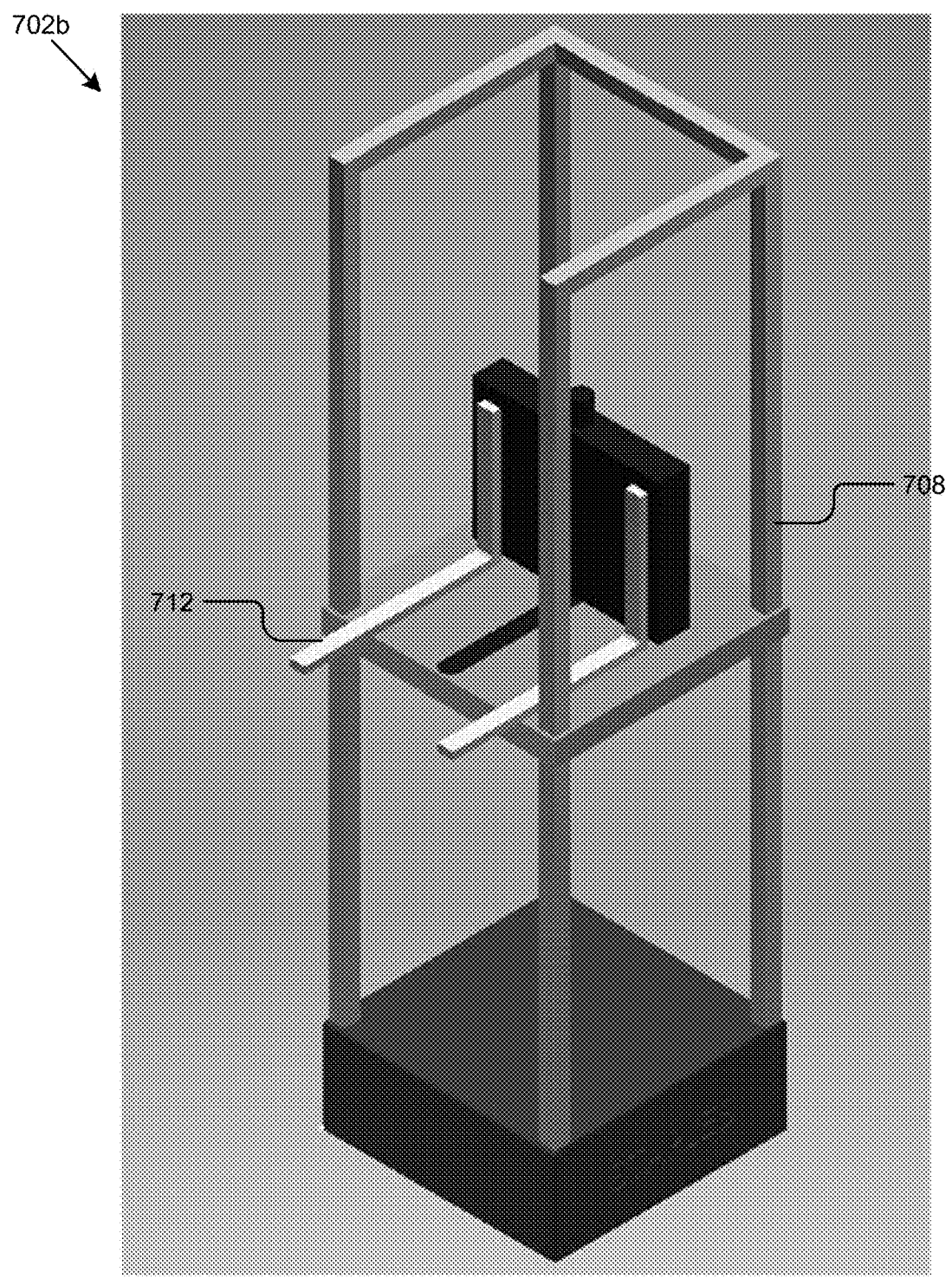
Figure 7D:
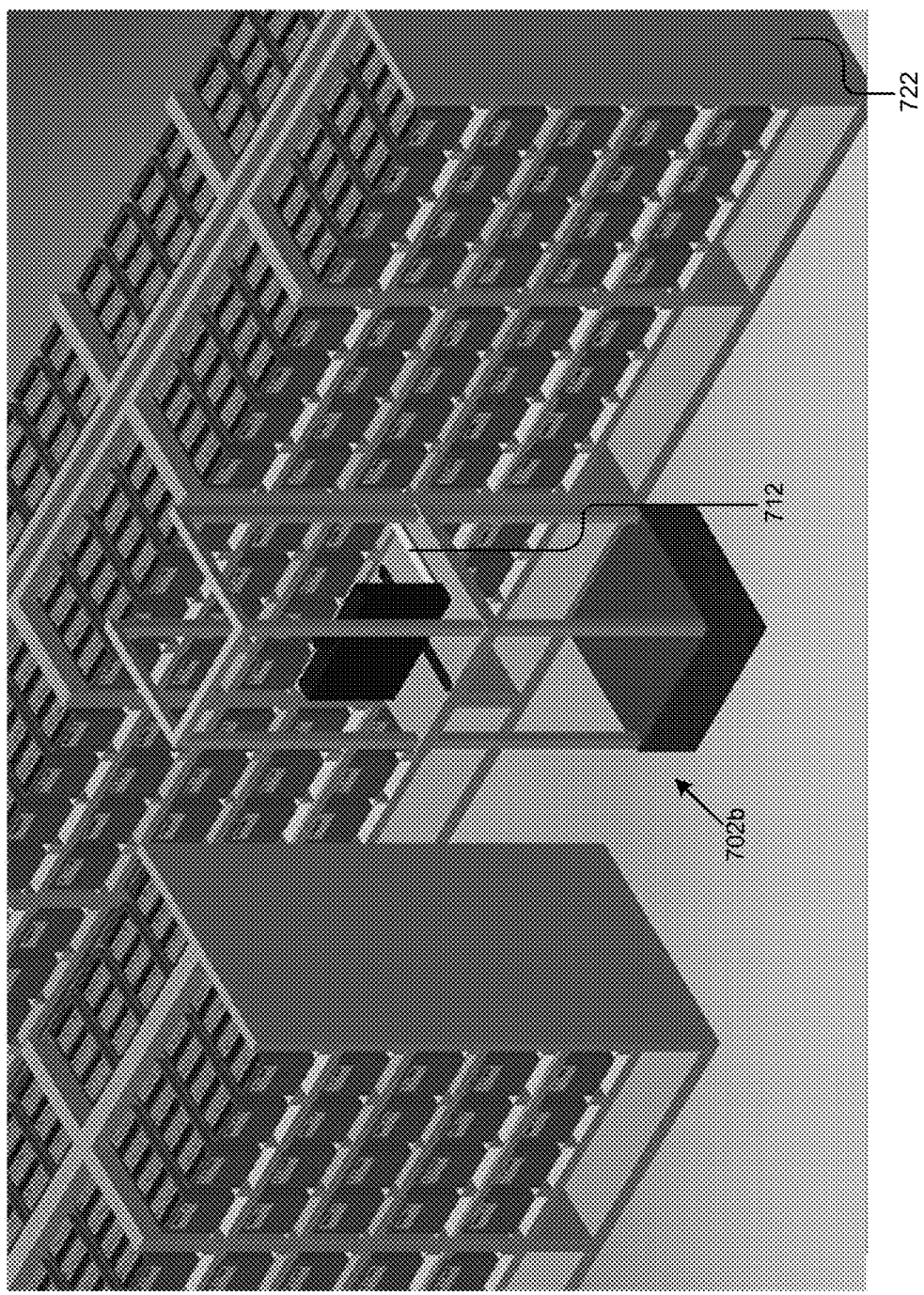
Figures 7E, 7F:
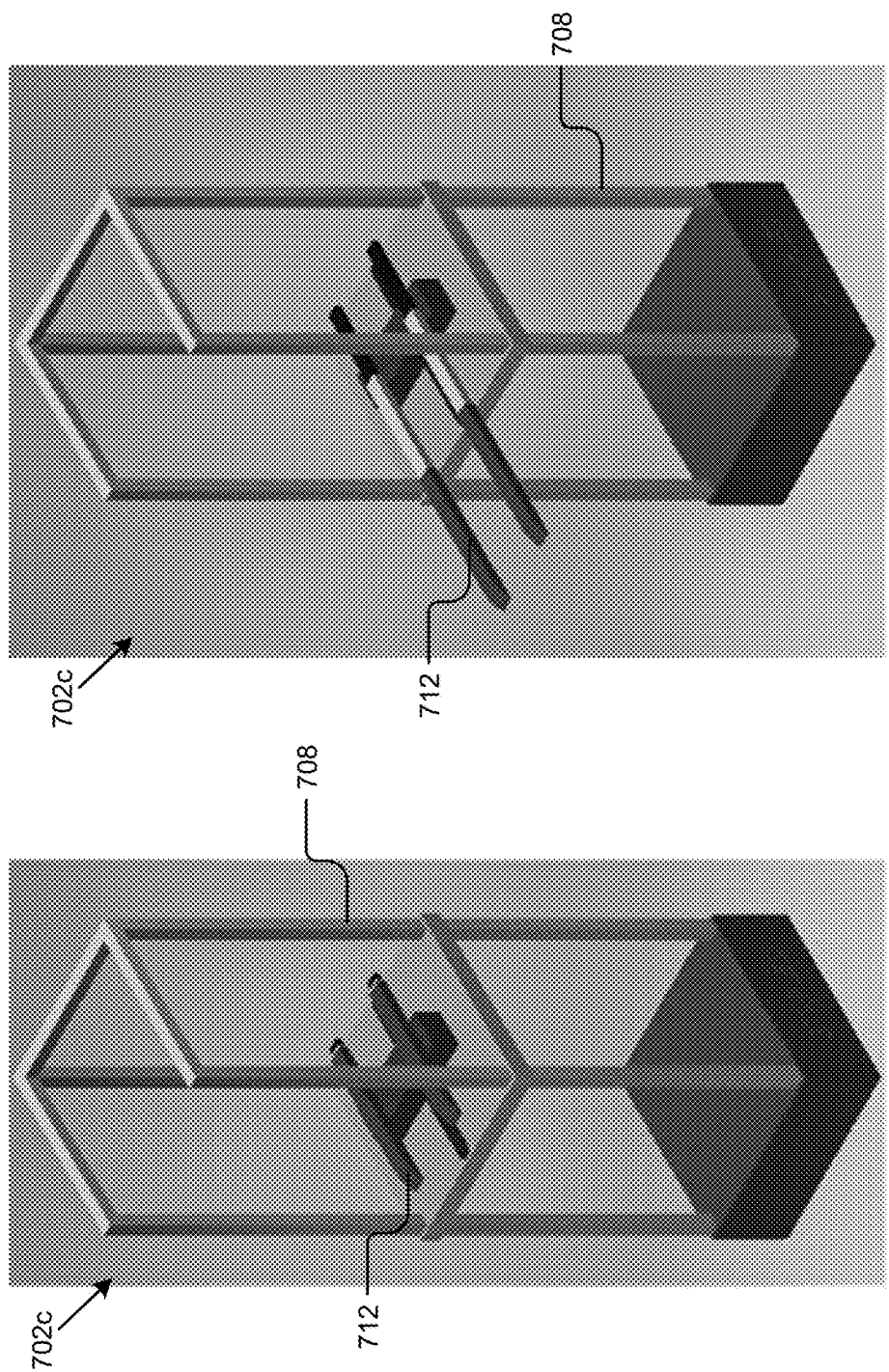

FIGS. 7A-7I are illustrations of example MSF AGVs 702a, 702b, 702c, 702d, and 702e (also referred to as 114 herein). FIGS. 7A and 7B illustrate a first example MSF AGV 702a. In some implementations, the MSF AGV 702a may have the capability to reach and retrieve different size of modular storage units 602 (e.g., pallets, totes, etc.) from different levels of static shelves. The MSF AGV 702a may be equipped with retrieval mechanism 704 adapted to interface with the holding structure of a modular storage unit 602 to retrieve a given modular storage unit 602 from a modular storage unit support structure 722 (e.g., a shelving unit, pick cell 382, or other support structure) and, in some implementations, place the modular storage unit 602 in a modular storage unit holder 706 of the MSF AGV 702. For instance, the retrieval mechanism 704 may be adapted to extract the modular storage unit 602 from a shelving unit (e.g., 722) and place of the modular storage unit 602 into a new location (e.g., a pick cell).

The retrieval mechanism 704 may include an elevator mechanism 708 to lift the modular storage unit 602 to one or more levels of the modular storage unit holder 706. The modular storage unit holder 706 may include one or more bays, shelves, or containers configured to receive modular storage units 602 in a single or various sizes. The retrieval mechanism 704 may be adapted to place a given modular storage unit 602 in any of the plurality of bays.

In some implementations, the retrieval mechanism of a MSF AGV 702 may include forks 712, such as those depicted in FIGS. 7C-7I, which are designed to engage with a corresponding support structure of the modular storage unit 602 (e.g., a bottom surface, preformed indentation(s), preconfigured channel(s), other structures or formations, etc.). Forks 712 can be made of any material, such as plastic or metal.

As illustrated in FIG. 7C-7F, the forks 712 may be attached to an elevator mechanism 708 and may be retractable, so the forks 712 may be placed at any desired height and maneuvered underneath and to lift the modular storage unit 602 from a shelving unit (e.g., 722) during extraction.

As illustrated in FIGS. 7D, 7G-7I, the retrieval mechanism of the MSF AGV may include a fork 712 coupled with the MSF AGV 702 and configured to lift the given modular storage unit 602 and remove the given modular storage unit 602 from the modular unit storage structure 722.

Figure 7G:
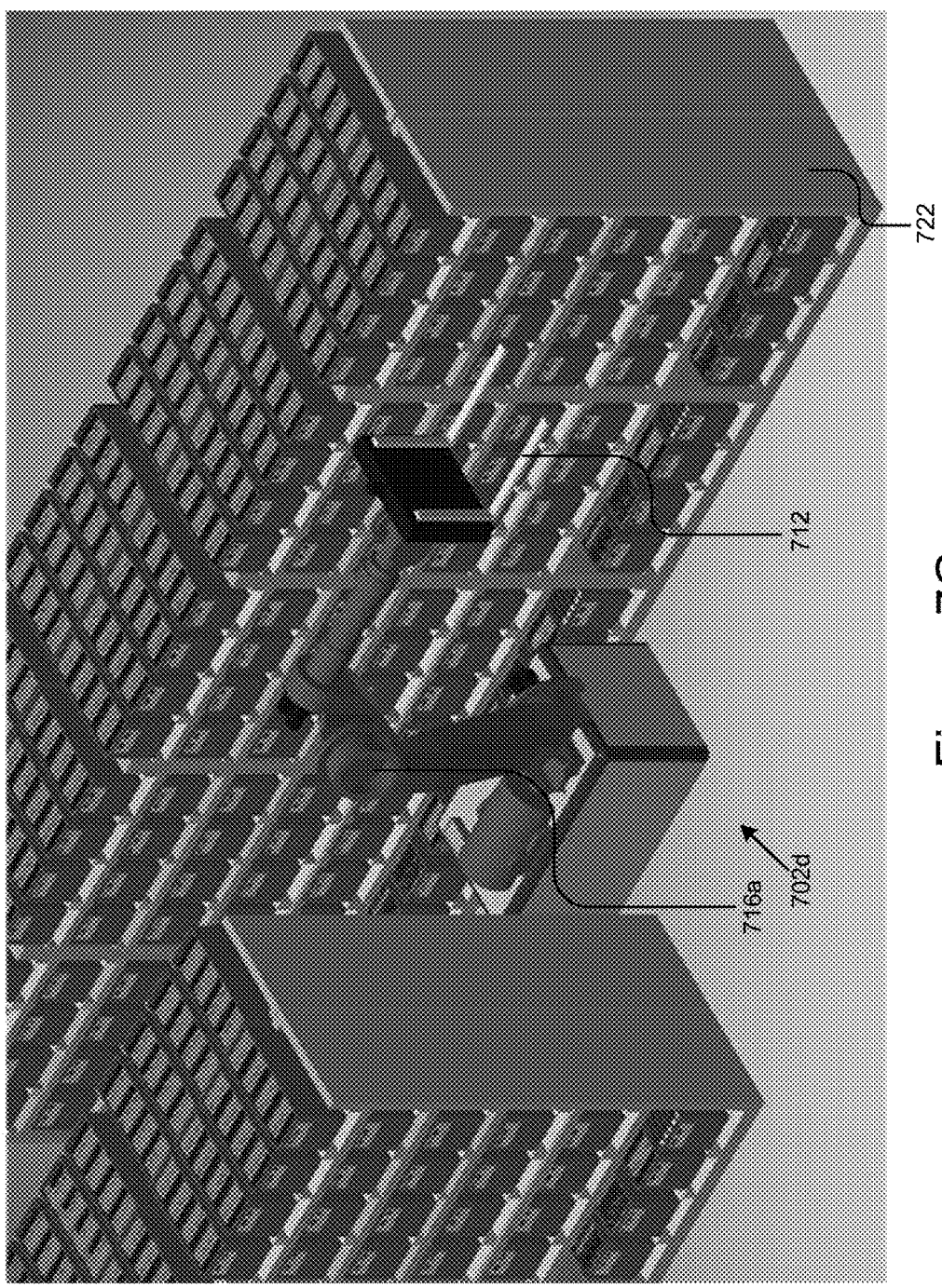
Figure 7H:
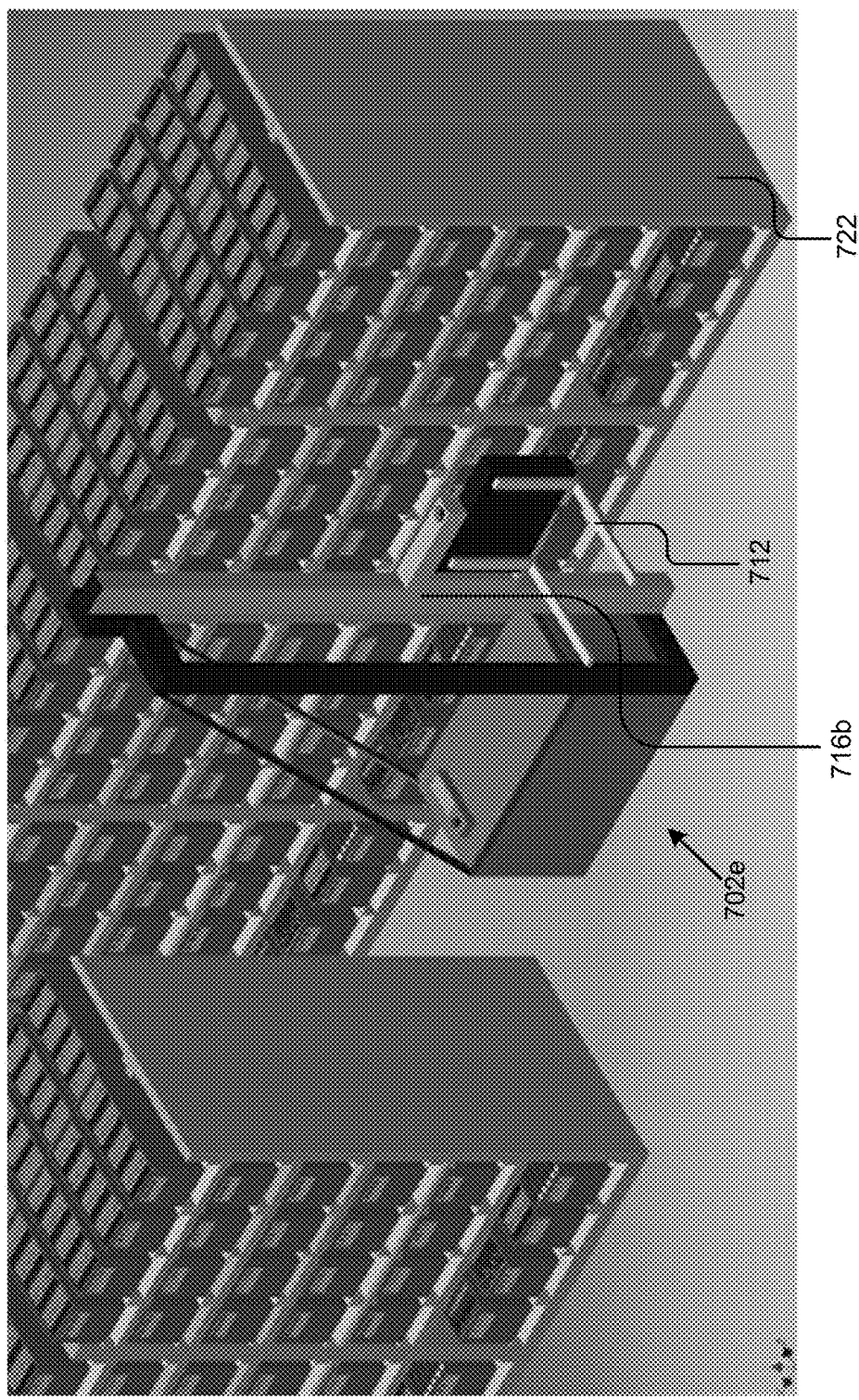
Figure 7I:
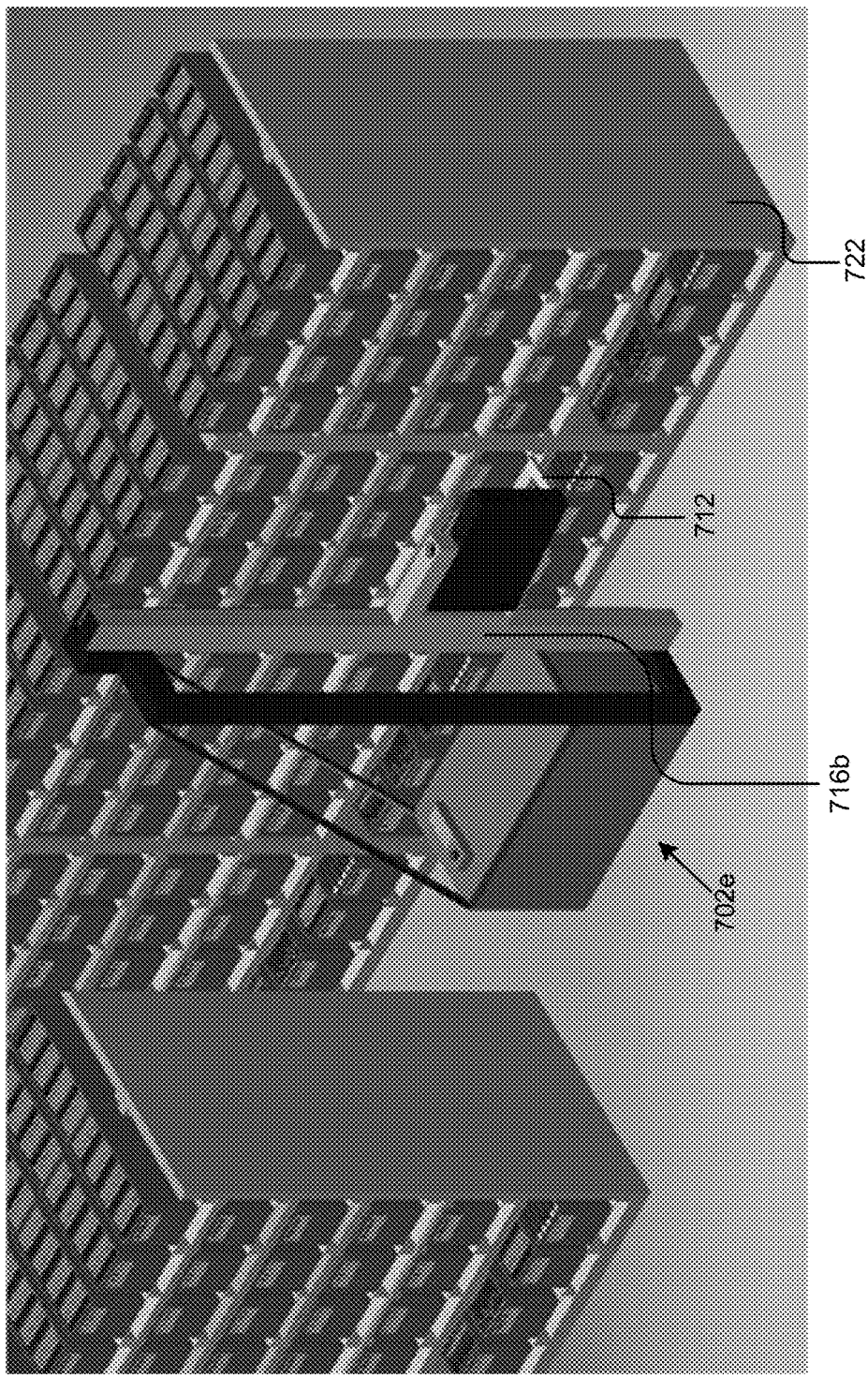

As illustrated in FIG. 7G-7I, the forks 712 may be attached to a robotic arm 716a or 716b and may be pivotable to extend underneath a modular storage unit 602 in order to lift the modular storage unit 602.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some embodiments, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   generating, by one or more computing devices, a picking schedule including pick-to-cart routing based on order data, the picking schedule indicating when to deliver one or more first items to a pick-cell station, the order data including one or more first identification codes representing the one or more first items located in a pick-to-cart area of a distribution facility, the picking schedule identifying one or more shipping cartons assigned to be transported by a cart automated guided vehicle (AGV) and into which the one or more first items of the order data may be placed;
   dispatching, by the one or more computing devices, the cart AGV according to the picking schedule, the cart AGV including a drive unit adapted to provide motive force to the cart AGV and a guidance system adapted to locate the cart AGV in the distribution facility, the cart AGV adapted to autonomously transport the one or more shipping cartons, the one or more shipping cartons adapted to hold items during transportation by the cart AGV and shipment to a shipping address;
   autonomously navigating, by the one or more computing devices, the cart AGV through the pick-to-cart area according to the pick-to-cart routing to allow picking of the one or more first items located in the pick-to-cart area; and
   autonomously navigating, by the one or more computing devices, the cart AGV to the pick-cell station according to the pick-to-cart routing.

2. The method of claim 1, wherein
   the order data includes one or more second identification codes representing one or more second items located in a high-density storage area of the distribution facility,
   the picking schedule includes a modular storage fetching (MSF) routing, and
   the method further includes
   dispatching, by the one or more computing devices, an MSF AGV according to the picking schedule, the MSF AGV including a drive unit adapted to provide motive force to the MSF AGV, a guidance system adapted to locate the MSF AGV in the distribution facility, and a modular storage unit holder adapted to hold one or more modular storage units, the MSF AGV adapted to autonomously retrieve the one or more modular storage units from the high-density storage area and transport the one or more modular storage units to the pick-cell station,
   autonomously navigating, by the one or more computing devices, the MSF AGV to a location of the one or more modular storage units in the high-density storage area, the one or more modular storage units containing the one or more second items, and
   autonomously retrieving, by the MSF AGV, the one or more modular storage units from the high-density storage area.

3. The method of claim 2, further comprising autonomously navigating, by the one or more computing devices, the MSF AGV from the location of the one or more modular storage units in the high-density storage area to the pick-cell station according to the MSF routing.

4. The method of claim 2, wherein
autonomously navigating the MSF AGV to the location of the one or more modular storage units in the high-density storage area includes
autonomously navigating the MSF AGV to a first location of a first modular storage unit in the high-density storage area, the first modular storage unit containing a first particular item of the one or more second items, and
autonomously navigating the MSF AGV from the first location of the first modular storage unit to a second location of a second modular storage unit, the second modular storage unit containing a second particular item of the one or more second items, and
autonomously retrieving, by the MSF AGV, the one or more modular storage units includes
autonomously retrieving, by the MSF AGV, the first modular storage unit from the first location of the first modular storage unit in the high-density storage area, and
autonomously retrieving, by the MSF AGV, the second modular storage unit from the second location of the second modular storage unit.

5. The method of claim 4, wherein the second location of the second modular storage unit is a second pick-cell station.

6. The method of claim 4, wherein the second location of the second modular storage unit is a different location of the high-density storage area than the first location of the first modular storage unit.

7. The method of claim 2, further comprising
autonomously navigating the MSF AGV from the location of the one or more modular storage units in the high-density storage area to the pick-cell station; and
autonomously delivering, by the MSF AGV, a first modular storage unit to the pick-cell station.

8. The method of claim 2, wherein the MSF AGV is further adapted to stage the one or more modular storage units at a staging area of the pick-cell station.

9. The method of claim 2, wherein the MSF AGV is adapted to retrieve multiple sizes of modular storage units.

10. The method of claim 2, wherein
the one or more modular storage units include a holding structure adapted to hold items, the holding structure adapted to interface with a retrieval mechanism of the MSF AGV, and
the MSF AGV includes the retrieval mechanism adapted to interface with the holding structure to retrieve a given modular storage unit from a modular storage unit support structure and place the given modular storage unit in the modular storage unit holder.

11. The method of claim 10, wherein
the retrieval mechanism of the MSF AGV includes a fork coupled with the MSF AGV and configured to lift the given modular storage unit and remove the given modular storage unit from the modular storage unit support structure, and
the modular storage unit support structure includes a shelf.

12. The method of claim 10, wherein
the modular storage unit holder of the MSF AGV is adapted to hold a plurality of modular storage units.

13. The method of claim 12, wherein
the modular storage unit holder of the MSF AGV includes a plurality of bays, each bay adapted to hold a modular storage unit, and
the retrieval mechanism is adapted to place the given modular storage unit in any of the plurality of bays.

14. The method of claim 2, wherein the pick-cell station includes an output device configured to provide picking instructions to a picker, the picking instructions indicating to the picker which of the one or more second items from the one or more modular storage units to place in a given shipping carton held on the cart AGV.

15. A method comprising:
dispatching, by one or more computing devices, a cart automated guided vehicle (AGV) according to a picking schedule that includes when to deliver one or more first items to a pick-cell station, the cart AGV including a drive unit adapted to provide motive force to the cart AGV and a guidance system adapted to locate the cart AGV in a distribution facility, the cart AGV adapted to autonomously transport one or more shipping cartons, the one or more shipping cartons adapted to hold one or more items during transportation by the cart AGV and shipment to a shipping address, the picking schedule identifying the one or more shipping cartons assigned to be transported by the cart AGV and into which the one or more first items may be placed;
dispatching, by the one or more computing devices, a modular storage fetching (MSF) AGV according to the picking schedule, the MSF AGV including a drive unit adapted to provide motive force to the MSF AGV and a guidance system adapted to locate the MSF AGV in the distribution facility, the MSF AGV adapted to hold a plurality of modular storage units and retrieve the plurality of modular storage units from a high-density storage area and transport the plurality of modular storage units to a pick-cell station;
autonomously navigating, by the one or more computing devices, the cart AGV through a pick-to-cart area according to the picking schedule to retrieve a first item located in the pick-to-cart area;
autonomously navigating, by the one or more computing devices, the cart AGV to the pick-cell station according to the picking schedule;
autonomously navigating the MSF AGV to a first location of a first modular storage unit in the high-density storage area, the first modular storage unit containing a second item;
autonomously retrieving, by the MSF AGV, the first modular storage unit from the first location;
autonomously navigating the MSF AGV from the first location to a second location of a second modular storage unit, the second modular storage unit containing a third item;
autonomously retrieving, by the MSF AGV, the second modular storage unit from the second location; and
autonomously delivering, by the MSF AGV, the first modular storage unit and the second modular storage unit to the pick-cell station.

16. A system comprising:
a first processor adapted to generate a picking schedule, the picking schedule indicating when to deliver one or more first items to a pick-cell station and including a pick-to-cart routing based on order data, the order data including one or more first identification codes representing the one or more first items located in a pick-to-cart area of a distribution facility, and to transmit a signal including the picking schedule to a second processor dispatching system, the picking schedule identifying one or more shipping cartons assigned to be transported by a cart automated guided vehicle (AGV) and into which the one or more first items of the order data may be placed;

the second processor adapted to dispatch the cart AGV according to the picking schedule, the cart AGV including a drive unit adapted to provide motive force to the cart AGV and a guidance system adapted to locate the cart AGV in the distribution facility, the cart AGV adapted to autonomously transport the one or more shipping cartons, the one or more shipping cartons adapted to hold one or more items during transportation by the cart AGV and shipment to a shipping address; and the cart AGV adapted to autonomously navigate through the pick-to-cart area according to the pick-to-cart routing to retrieve the one or more first items located in the pick-to-cart area, and autonomously navigate to a pick-cell station according to the pick-to-cart routing.

17. The system of claim 16 further comprising a modular storage fetching (MSF) AGV including a drive unit adapted to provide motive force to the MSF AGV, a guidance system adapted to locate the MSF AGV in the distribution facility, and a modular storage unit holder adapted to hold one or more modular storage units, the MSF AGV adapted to autonomously retrieve the one or more modular storage units from a high-density storage area and transport the one or more modular storage units to the pick-cell station.

18. The system of claim 17 wherein the MSF AGV is further configured to autonomously navigate to a location of the one or more modular storage units in the high-density storage area, the one or more modular storage units containing a second item, and autonomously retrieve the one or more modular storage units from the high-density storage area.

19. The system of claim 18 wherein the MSF AGV is further configured to autonomously navigate from the location of the one or more modular storage units in the high-density storage area to the pick-cell station, and autonomously deliver the one or more modular storage units to the pick-cell station.

20. The system of claim 17 wherein the second processor is further configured to dispatch the MSF AGV according to the picking schedule.

* * * * *